US011292140B2

(12) United States Patent
Motowaki

(10) Patent No.: US 11,292,140 B2
(45) Date of Patent: Apr. 5, 2022

(54) GRIPPING DEVICE FOR GRIPPING WORKPIECE

(71) Applicant: Fanuc Corporation, Yamanashi (JP)

(72) Inventor: Yoshio Motowaki, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 197 days.

(21) Appl. No.: 16/829,397

(22) Filed: Mar. 25, 2020

(65) Prior Publication Data

US 2020/0353627 A1 Nov. 12, 2020

(30) Foreign Application Priority Data

May 8, 2019 (JP) .............................. JP2019-088453

(51) Int. Cl.
*B25J 15/02* (2006.01)
*B25J 15/10* (2006.01)
*B25J 9/16* (2006.01)

(52) U.S. Cl.
CPC .......... *B25J 15/026* (2013.01); *B25J 9/1612* (2013.01); *B25J 15/10* (2013.01)

(58) Field of Classification Search
CPC .. B25J 15/0052; B25J 15/0253; B25J 15/026; B25J 15/10; B25J 15/103; B25J 15/106; B25J 9/1612
USPC ..................................................... 294/119.1
See application file for complete search history.

(56) References Cited

U.S. PATENT DOCUMENTS

| 5,639,136 A * | 6/1997 | Rosengren ............... B25J 9/146 294/115 |
| 6,309,003 B1 * | 10/2001 | Bertini ................. B25J 15/0253 294/119.1 |
| 7,044,706 B2 * | 5/2006 | Jung .................... B25J 15/0052 414/737 |
| 8,684,432 B2 * | 4/2014 | Saka ....................... B25J 15/08 294/119.1 |
| 2018/0178396 A1 * | 6/2018 | Ochiishi .............. B25J 15/0061 |

FOREIGN PATENT DOCUMENTS

| JP | 47034768 U | 12/1972 |
| JP | 49086574 U | 7/1974 |
| JP | 04106184 U | 9/1992 |
| JP | 2001038432 A | 12/2001 |

* cited by examiner

Primary Examiner — Dean J Kramer
(74) Attorney, Agent, or Firm — RatnerPrestia

(57) ABSTRACT

An operation tool as a gripping device includes a first arm and a second arm that move in directions opposite to each other, and a third arm for engaging with a workpiece. The operation tool includes a gear and a gear moving cylinder for causing the gear to move to a first position, a second position, and a third position between the first position and the second position. The first arm and the second arm move when the gear is disposed at the first position. The third arm moves when the gear is disposed at the second position. The gear is separated from all of the arms when the gear is disposed at the third position.

4 Claims, 21 Drawing Sheets

GRIPPING DEVICE FOR GRIPPING WORKPIECE

CROSS-REFERENCE TO RELATED APPLICATIONS

This application is a new U.S. Patent Application that claims benefit of Japanese Patent Application No. 2019-088453, dated May 8, 2019, the disclosure of this application is being incorporated herein by reference in its entirety for all purposes.

BACKGROUND OF THE INVENTION

1. Field of the Invention

The present invention relates to a gripping device for gripping a workpiece.

2. Description of the Related Art

It is known that, when manufacturing a product, a workpiece is fixed by a gripping device in order to perform various processing operations. For example, it is known to arrange components or to perform painting on a workpiece that is fixed by the gripping device.

Alternatively, it is known to attach a gripping device for gripping a workpiece to a robot in order to serve as an operation tool in case where a workpiece is conveyed by a device including the robot. With the robot changing a position and orientation thereof in a state where the gripping device grips the workpiece, it is possible to place the workpiece at any position or convey the workpiece (e.g., Japanese Unexamined Utility Model Publication No. 4-106184U).

The gripping device has members opposing each other to be able to clamp the workpiece by bringing the members close to or apart from each other, Here, depending on the type of the workpiece, there may be a case where the workpiece cannot be stably gripped only by clamping the workpiece. In the related art, there is known a gripping device including, in addition to the two members for clamping the workpiece, a member for engaging with the workpiece. In order to drive such a member for gripping a workpiece, it is known to use a mechanism having a rack and a pinion or a linkage mechanism. As a drive source for driving the member, use of a motor or a cylinder is known (e.g., Japanese Unexamined Utility Model Publication No. 47-34768U and Japanese Unexamined Utility Model Publication No. 49-86574U).

In addition, as a cylinder for driving various components, a cylinder in which a piston rod stops at two positions, as well as a cylinder in which a piston rod stops at three positions (e.g., Japanese Unexamined Patent Publication No. 2001-38432A) are known.

SUMMARY OF THE INVENTION

Depending on the device for performing processing on a workpiece, there may be a case where a plurality of types of workpieces of different sizes are processed. In a case where a plurality of types of workpieces are fixed, a gripping device may be replaced in accordance with the size of the workpiece. In this case, a drawback may arise where a plurality of gripping devices are required. Also, another drawback may arise where an extra time is required for replacing the gripping device, prolonging working hours.

Alternatively, in a case where a workspace is small, it may not be possible to secure a depository for storing a plurality of gripping devices.

For example, a robot apparatus including a robot and an operation tool is capable of conveying workpieces having a plurality of sizes by replacement of an operation tool therefor. The operation tool can be automatically replaced by using an auto tool changer. However, a drawback may arise from this where a plurality of operation tools need to be prepared in advance. Moreover, another drawback may arise where an extra time is required for replacing the operation tool, lowering working efficiency. In addition to these, in a case where the workspace is small, it may not be possible to secure a depository for operation tool placement.

Alternatively, an operation tool capable of gripping workpieces having a plurality of sizes can be used. However, a drawback may arise from this where the operation tool becomes heavier because a motor, a cylinder, and component members and the like of the operation tool to be used need to be larger. A weight of the operation tool to be attached to the robot is limited. A robot of a small size is unable to manipulate an operation tool of a large size, and this results in requiring a plurality of operation tools. In particular, an operation tool engaging with a workpiece at three or more points require a larger number of motors for driving the members for gripping the workpiece. As a result, even if the workpiece is lightweight, as the weight of the operation tool increases, a drawback arises where the robot of a small size is unable to manipulate the workpiece.

One aspect of the present disclosure is a gripping device for gripping a workpiece. The gripping device includes a first arm and a second arm that move in directions opposite to each other and clamp the workpiece. The gripping device includes a third arm that moves in a direction intersecting the directions, in which the first arm and the second arm move, and engages with the workpiece. The gripping device includes a rotation member coming into contact with the first arm, the second arm, and the third arm, and moving the respective arms, and a rotary machine for rotating the rotation member. The gripping device includes a rotation member moving cylinder for moving the rotation member to a first position, a second position, and a third position between the first position and the second position. The first arm and the second arm are arranged such that, when the rotation member is disposed at the first position, the first arm comes into contact with one side of the rotation member and the second arm comes into contact with another side of the rotation member. The third arm is disposed so as to come into contact with the rotation member when the rotation member is disposed at the second position. The first arm, the second arm, and the third arm are arranged to be separated from the rotation member when the rotation member is disposed at the third position.

DETAILED DESCRIPTION

A gripping device in an embodiment will be described with reference to FIG. 1 to FIG. 22. The gripping device of the present embodiment is formed so as to be able to grip workpieces of various sizes.

Figure 1:
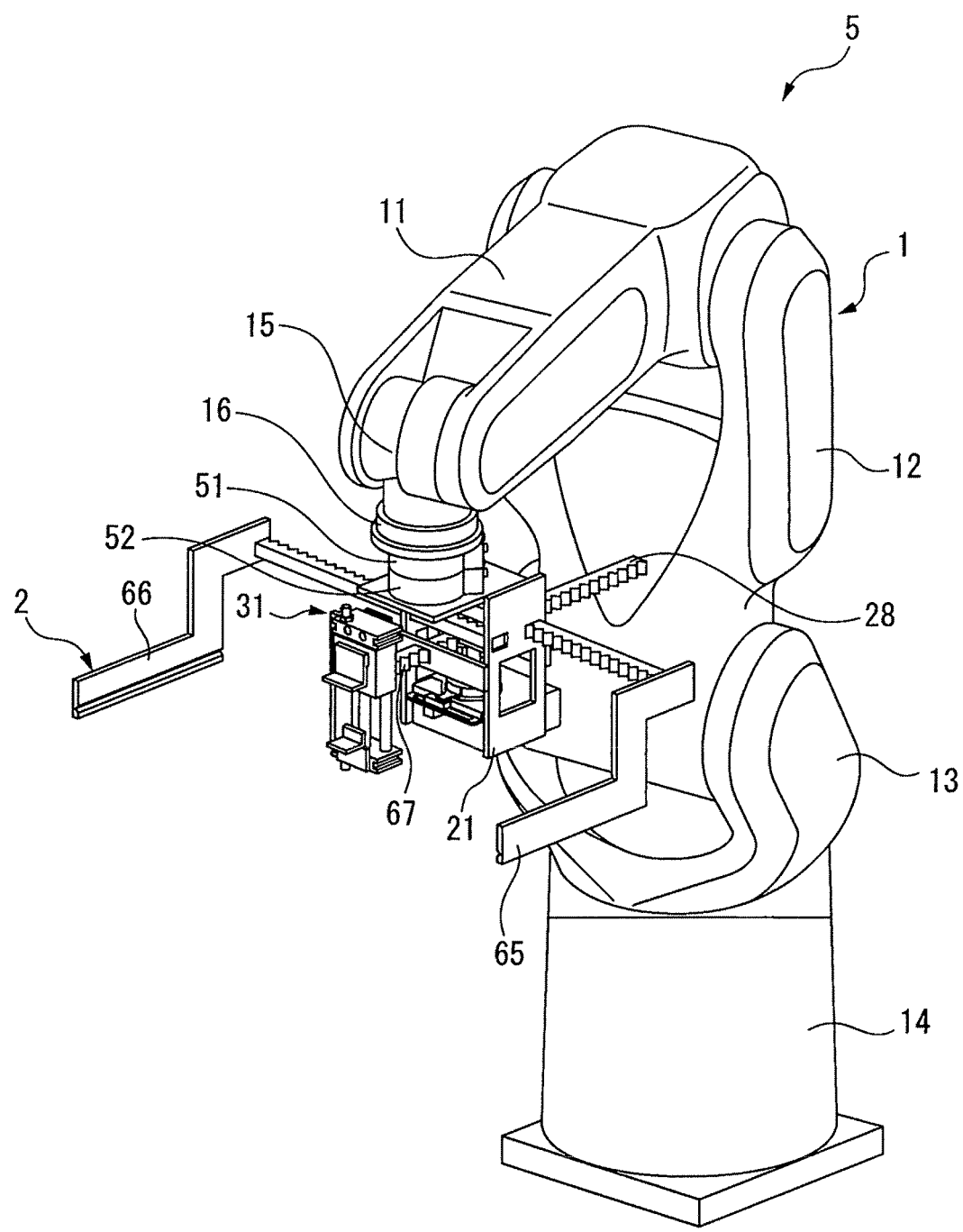
FIG. 1 is a perspective view of a robot apparatus in an embodiment.

FIG. 1 is a schematic view of a robot apparatus in the present embodiment. A robot apparatus 5 includes an operation tool 2 and a robot 1 for moving the operation tool 2. A first gripping device of the present embodiment is the operation tool 2 of the robot 1. The operation tool 2 is coupled to the robot 1. The robot apparatus 5 conveys a workpiece by the robot 1 changing a position and an orientation in a state where the workpiece is gripped by the operation tool 2.

The robot 1 of the present embodiment is an articulated robot having a plurality of joints. The robot 1 includes a base 14 and a turning base 13 supported by the base 14. The base 14 is fixed to an installation surface. The turning base 13 is formed so as to rotate relative to the base 14. The robot 1 includes an upper arm 11 and a lower arm 12. The lower arm 12 is pivotally supported by the turning base 13 via the joint. The upper arm 11 is pivotally supported by the lower arm 12 via the joint. The upper arm 11 rotates about a rotation axis parallel to the extending direction of the upper arm 11.

The robot 1 includes a wrist 15 that is coupled to an end portion of the upper arm 11. The wrist 15 is pivotally supported by the upper arm 11 via the joint. The wrist 15 includes a flange 16 that is formed to be rotatable. The operation tool 2 is fixed to the flange 16. The robot 1 of the present embodiment includes six driving axes, but the embodiment is not limited to this. Any robot capable of changing the position and the orientation of the operation tool 2 can be employed.

The robot apparatus 5 in the present embodiment includes an auto tool changer (ATC) capable of automatically replacing an operation tool. The auto tool changer includes a robot-side plate 51 attached to the flange 16 of the robot 1 and a tool-side plate 52 attached to the operation tool 2. The tool-side plate 52 is formed so as to be coupled to or released from the robot-side plate 51. Note that the operation tool 2 may be fixed to the flange 16 without the auto tool changer therebetween.

Figure 2:
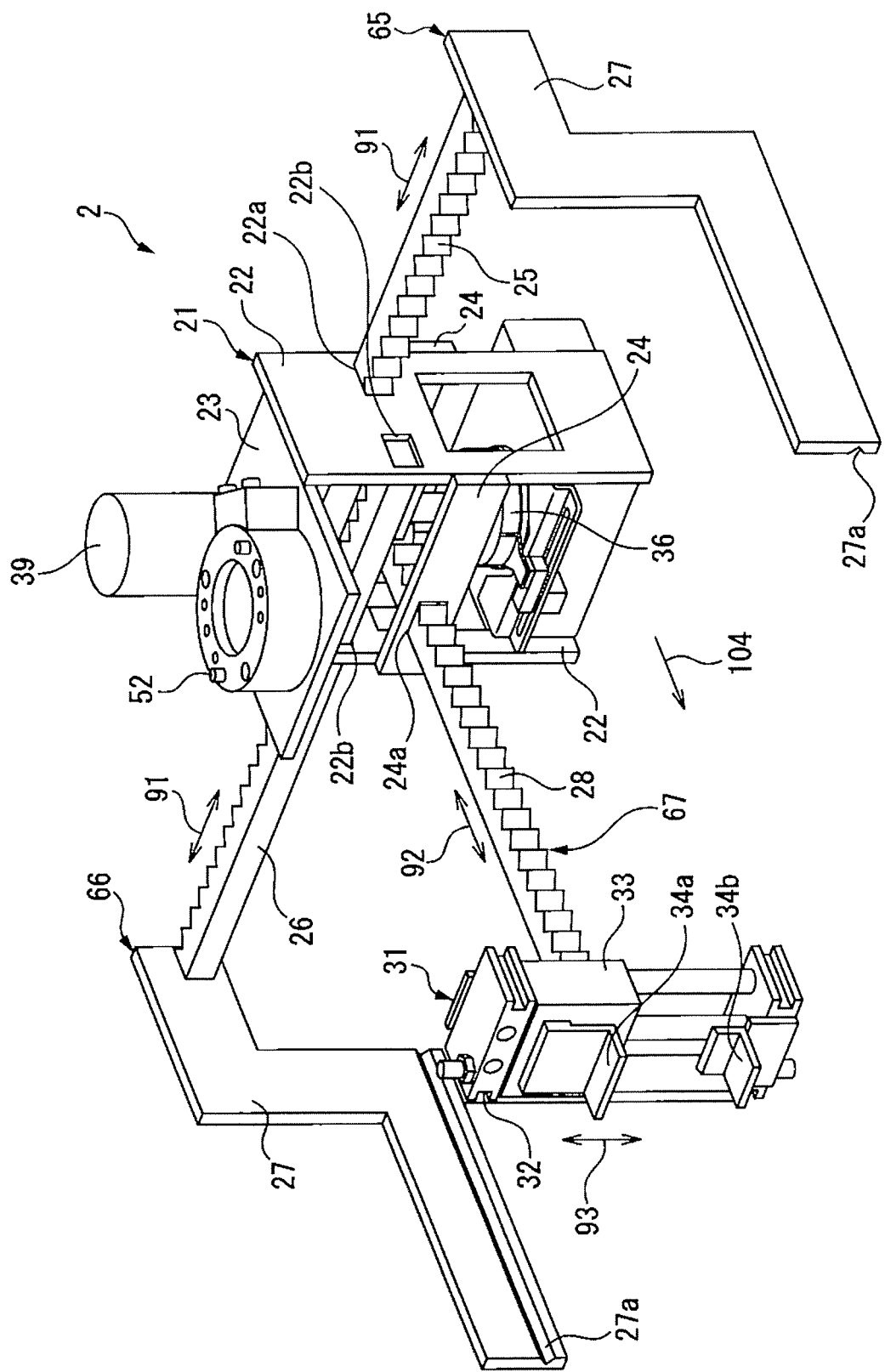
FIG. 2 is a perspective view of an operation tool, as a first gripping device, when viewed from a front side thereof in the embodiment.
Figure 3:
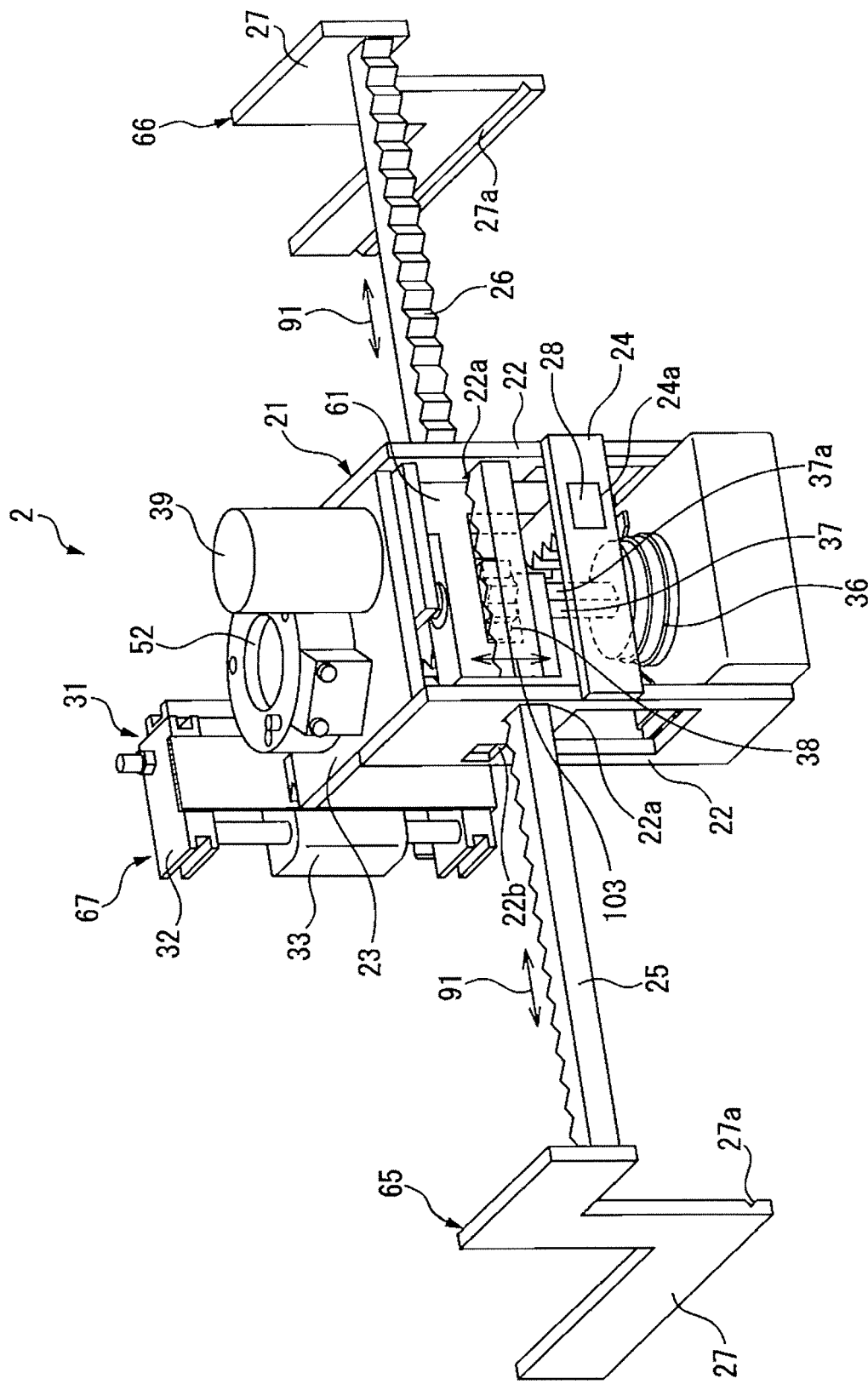
FIG. 3 is a perspective view the operation tool, as the first gripping device, when viewed from a rear side thereof.

FIG. 2 illustrates a perspective view of the operation tool in the present embodiment when viewed from a front side thereof. FIG. 3 illustrates a perspective view of the operation tool in the present embodiment when viewed from a rear side thereof. In the present embodiment, as indicated by an arrow 104, the side on which the workpiece is disposed is referred to as the front side. The operation tool 2 includes a frame body 21 including a top plate 23 and side plates 22, The tool-side plate 52 of the auto tool changer is fixed to the top plate 23. The side plates 22 support the top plate 23, as well as a first arm 65 and a second arm 66. The frame body 21 includes two support plates 24 for supporting a third arm 67. The support plates 24 are arranged on the front side and the back side of the side plates 22.

The operation tool 2 includes the first arm 65 and the second arm 66 that move in directions opposite to each other. The workpiece is clamped between the first arm 65 and the second arm 66. The first arm 65 includes a rod-shaped member 25 and a press plate 27 fixed to an end portion of the rod-shaped member 25. The second arm 66 includes a rod-shaped member 26 and the press plate 27 fixed to an end portion of the rod-shaped member 26. The rod-shaped member 25 and the rod-shaped member 26 are inserted through holes 22a and 22b that are formed through the side plates 22, respectively. The rod-shaped member 25 and the rod-shaped member 26 are supported in the holes 22a and 22b, respectively.

The press plates 27 each include a groove 27a that linearly extends. The grooves 27a are formed so as to extend from the front-end portion to the rear-end portion of the press plate 27, The workpiece in the present embodiment is a plate-shaped member. The grooves 27a are each formed into which an end portion of the workpiece is inserted.

The operation tool 2 includes the third arm 67 that moves in a direction intersecting the directions in which the first arm 65 and the second arm 66 move. In the present embodiment, the third arm 67 moves in a direction perpendicular to the directions in which the first arm 65 and the second arm 66 move, as indicated by an arrow 92. The third arm 67 includes a rod-shaped member 28 and a clamping device 31 fixed to an end portion of the rod-shaped member 28.

The operation tool 2 includes a rotation member that comes into contact with the first arm 65, the second arm 66, and the third arm 67 and causes the respective arms 65, 66, and 67 to move. In the present embodiment, a gear 38 is disposed as the rotation member. The gear 38 of the present embodiment is a spur gear. The operation tool 2 includes a gear driving motor 36 as a rotary machine for rotating the gear 38. As the rotary machine for rotating the rotation member, any rotary machine can be employed without being limited to an electric motor. For example, the rotary machine may be a rotary machine that is driven by hydraulic pressure.

The gear driving motor 36 includes a shaft 37 for outputting a rotational force. The shaft 37 is formed with a cutout 37a that is formed in a planar shape. The gear 38 includes a hole corresponding to the cross-sectional shape of the shaft 37. The shaft 37 is inserted through the hole. With the cutout 37a being formed in the shaft 37, the gear 38 is prevented from spinning around the shaft 37.

The first arm 65 and the second arm 66 move in the direction indicated by an arrow 91. That is, the rod-shaped member 25 and the rod-shaped member 26 move in the axial direction. The rod-shaped member 25 and the rod-shaped member 26 are arranged so as to oppose each other. A plurality of teeth for engaging with the gear 38 are formed on respective surfaces of the rod-shaped members 25 and 26, which face the gear 38. In the present embodiment, the first arm 65 and the second arm 66 move by a rack and a pinion mechanism.

The third arm 67 moves in the axial direction of the rod-shaped member 28. The rod-shaped member 28 is inserted through a hole 24a that is formed through the support plate 24. The rod-shaped member 28 is supported in the hole 24a of the support plate 24 on the front side and the hole 24a of the support plate 24 on the rear side. A plurality of teeth are formed on the surface, which is on the side facing the gear 38, of the rod-shaped member 28 so as to engage with the teeth of the gear 38. In the present embodiment, the third arm 67 moves by a rack and a pinion mechanism.

The clamping device 31 of the third arm 67 is formed so as to be able to clamp the workpiece. The clamping device 31 includes a frame body 32. The clamping device 31 includes claw parts 34a and 34b for clamping the workpiece. The clamping device 31 includes a claw part driving cylinder 33 for causing the claw part 34a to move in a direction indicated by an arrow 93. The claw part driving cylinder 33 is supported by the frame body 32. With the claw part driving cylinder 33 being driven, the claw part 34a moves in a direction toward the claw part 34b, thus this causes the claw part 34a and the claw part 34b to clamp the workpiece.

The gear 38 in the present embodiment is formed so as to slide relative to the shaft 37, That is, the gear 38 moves along the axial direction of the shaft 37, as indicated by an arrow 103, In the present embodiment, the gear 38 moves to a first position, a second position, and a third position. The gear 38 engages with the first arm 65 and the second arm 66 at the first position. The gear 38 engages with the third arm 67 at the second position. The gear 38 is separated from all of the arms 65, 66, and 67 at the third position.

The operation tool 2 includes a gear moving cylinder 39 as a rotation member moving cylinder for causing the gear 38 to move to the first position, the second position, and the third position. The operation tool 2 includes a movement member 61 that is coupled to the gear moving cylinder 39. With the gear moving cylinder 39 being driven, the movement member 61 moves along the axial direction of the shaft 37, as indicated by the arrow 103. The movement member 61 presses the gear 38 whereby the gear 38 moves to the first position, the second position, and the third position.

Figure 4:
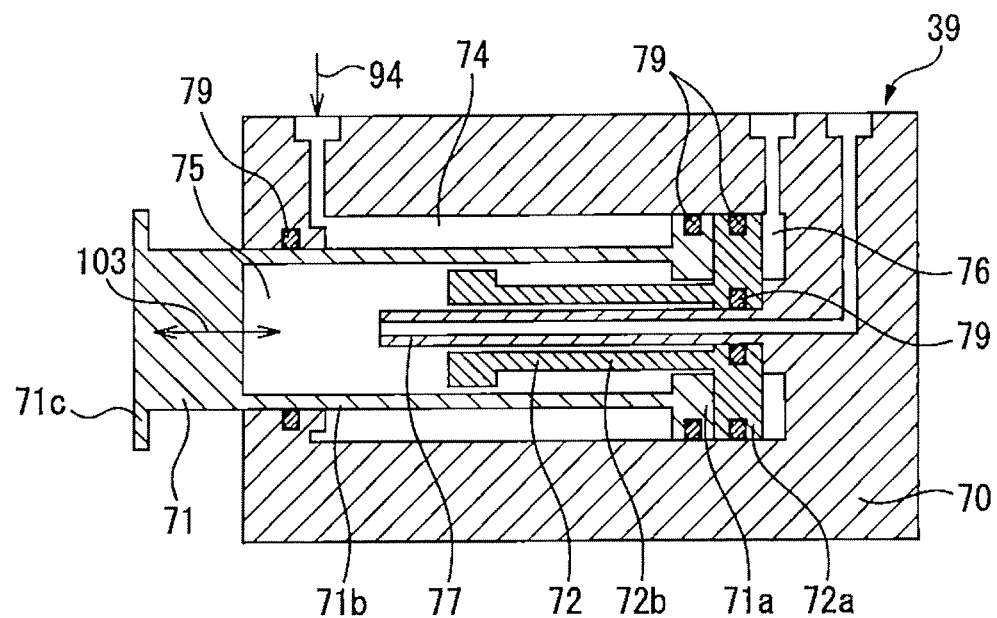
FIG. 4 is a first schematic cross-sectional view of a gear moving cylinder in the embodiment.

FIG. 4 illustrates a first schematic cross-sectional view of the gear moving cylinder in the present embodiment. The gear moving cylinder 39 in the present embodiment is a three-position cylinder. The gear moving cylinder 39 is formed such that a first slide member 71 thereof that is fixed to the movement member 61 stops at three positions.

The gear moving cylinder 39 includes a housing 70 and the first slide member 71 that is disposed in a space inside the housing 70. The first slide member 71 includes a first piston 71a, a first piston rod 71b, and a flange 71c that is disposed at a tip of the first piston rod 71b. A space is formed inside the first slide member 71.

The gear moving cylinder 39 includes a second slide member 72 that moves coaxially with the first slide member 71. The second slide member 72 includes a second piston 72a and a second piston rod 72b. An air supply pipe 77 is inserted through the interior of the second slide member 72. A sealing member 79 is disposed at a portion where the first slide member 71 comes into contact with the housing 70, The sealing member 79 is also disposed at a portion where the second slide member 72 comes into contact with the housing 70, and at a portion where the second slide member 72 comes into contact with the air supply pipe 77.

An air chamber 74 is formed between the inner side surface of the housing 70 and the outer side surface of the first slide member 71. An air chamber 75 is formed inside the first slide member 71, Moreover, an air chamber 76 is formed by a space enclosed by the second piston 72a of the second slide member 72 and the inner surface of the housing 70.

FIG. 4 illustrates the gear moving cylinder 39 when the gear 38 is disposed at the first position. As indicated by an arrow 94, a pressurized air is supplied to the air chamber 74. No pressurized air is supplied to the air chambers 75 and 76. The first slide member 71 is drawn into the housing 70.

Figure 5:
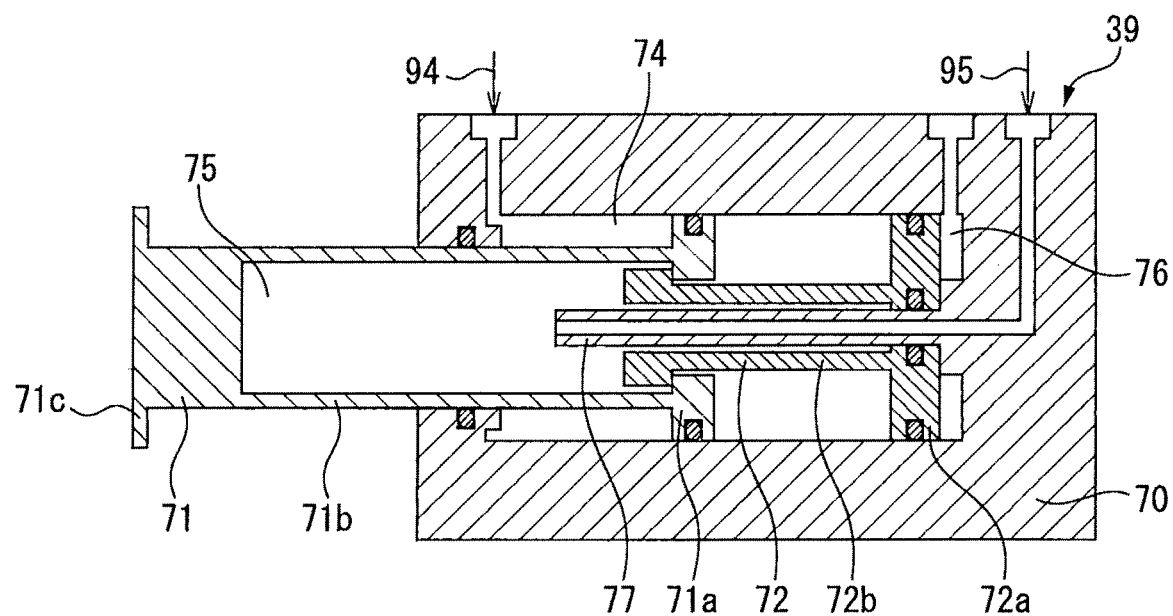
FIG. 5 is a second schematic cross-sectional view of the gear moving cylinder.
Figure 6:
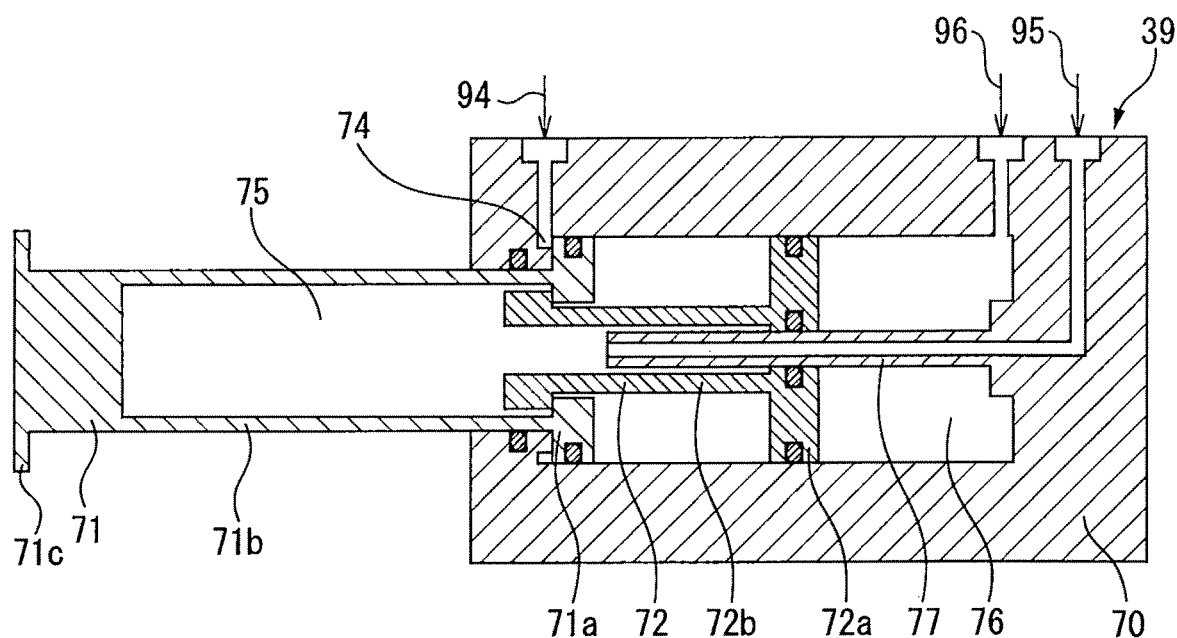
FIG. 6 is a third schematic cross-sectional view of the gear moving cylinder.

FIG. 5 illustrates a second schematic cross-sectional view of the gear moving cylinder in the present embodiment. FIG. 6 illustrates a third schematic cross-sectional view of the gear moving cylinder in the present embodiment. FIG. 5 illustrates the gear moving cylinder 39 when the gear 38 is disposed at the third position. FIG. 6 illustrates the gear moving cylinder 39 when the gear 38 is disposed at the second position. Referring to FIG. 5, the first slide member 71 is disposed at a middle position. As indicated by the arrows 94 and 95, a pressurized air is supplied to the air chamber 74 and the air chamber 75, The first slide member 71 is disposed at a position protruding from the position illustrated in FIG. 4 due to the air pressure in the air chamber 75.

Referring to FIG. 6, the first slide member 71 is disposed at the most protruding position. As indicated by the arrows 94, 95, and 96, a pressurized air is supplied to the air chambers 74, 75, and 76. The second slide member 72 moves outward due to the air pressure in the air chamber 76. As such, the gear moving cylinder 39 in the present embodiment is formed such that the first slide member 71 thereof stops at three positions so as to be maintained at the positions.

Figure 7:
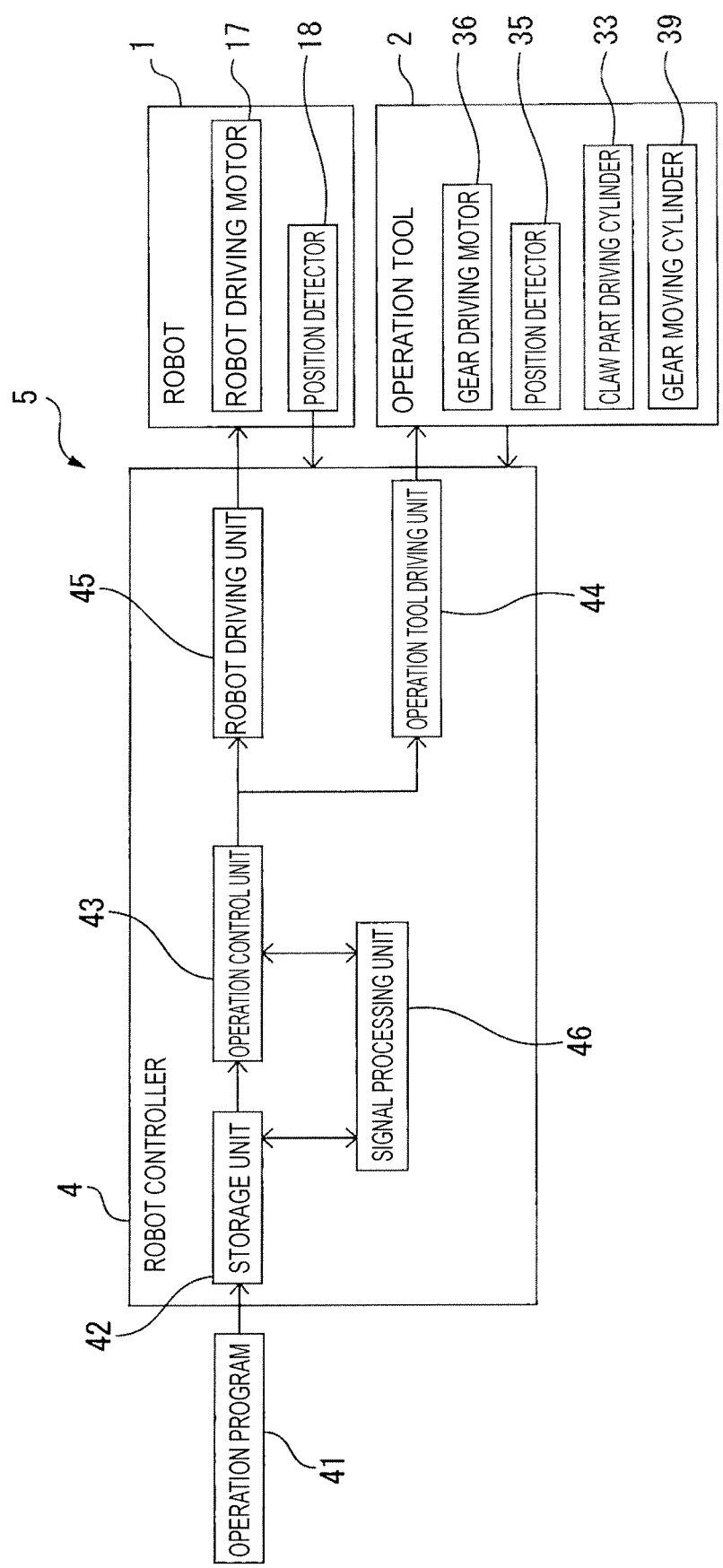
FIG. 7 is a block diagram of the robot apparatus in the embodiment.

FIG. 7 illustrates a block diagram of the robot apparatus in the present embodiment. Referring to FIG. 1, FIG. 2, and FIG. 7, the robot 1 includes a robot driving device for changing the position and the orientation of the robot 1. The robot driving device includes a plurality of robot driving motors 17 for driving component members, e.g., the arm and the wrist. The robot driving motor 17 is disposed for each of the plurality of component members. With the robot driving motor 17 being driven, the orientations of the respective component members change.

The robot apparatus 5 includes a robot controller 4 for controlling the robot 1 and the operation tool 2. The robot controller 4 includes an arithmetic processing device (computer) including a Central Processing Unit (CPU) as a processor. The arithmetic processing device includes a Random Access Memory (RAM), a Read Only Memory (ROM), and the like that are connected to the CPU via a bus. An operation program 41 is input to the robot controller 4 in order to control the robot 1 and the operation tool 2, Alternatively, the robot controller 4 creates the operation program 41 by teaching operation by an operator. The robot controller 4 includes a storage unit 42 for storing information relating to control of the robot apparatus 5. The storage unit 42 can be configured of a storage medium capable of storing information, e.g., a volatile memory, a non-volatile memory, or a hard disk. The operation program 41 is stored in the storage unit 42. The robot apparatus 5 of the present embodiment conveys the workpiece on the basis of the operation program 41.

The robot controller 4 includes an operation control unit 43 for sending an operation command. The CPU as the processor acquires the operation program 41 and performs control as defined in the operation program 41, thus functions as the operation control unit 43. The operation control unit 43 sends to a robot driving unit 45 the operation command for driving the robot 1 on the basis of the operation program 41, The robot driving unit 45 includes an electric circuit for driving the robot driving motor 17. The robot driving unit 45 supplies electricity to the robot driving motor 17 on the basis of the operation command.

The robot 1 includes a state detector for detecting the position and the orientation of the robot 1. The state detector in the present embodiment includes a position detector 18 attached to the robot driving motor 17. The robot controller 4 detects the position and the orientation of the robot 1, on the basis of the output from the position detector 18.

Moreover, the operation control unit 43 sends to an operation tool driving unit 44 the operation command for driving the operation tool 2 on the basis of the operation program 41. The operation tool driving unit 44 includes an electric circuit and a pneumatic circuit for driving the driving device of the operation tool 2. The operation tool driving unit 44 supplies electricity to the gear driving motor 36 on the basis of the operation command. Moreover, the operation tool driving unit 44 supplies a pressurized air to the claw part driving cylinder 33 and the gear moving cylinder 39 on the basis of the operation command.

Figure 8:
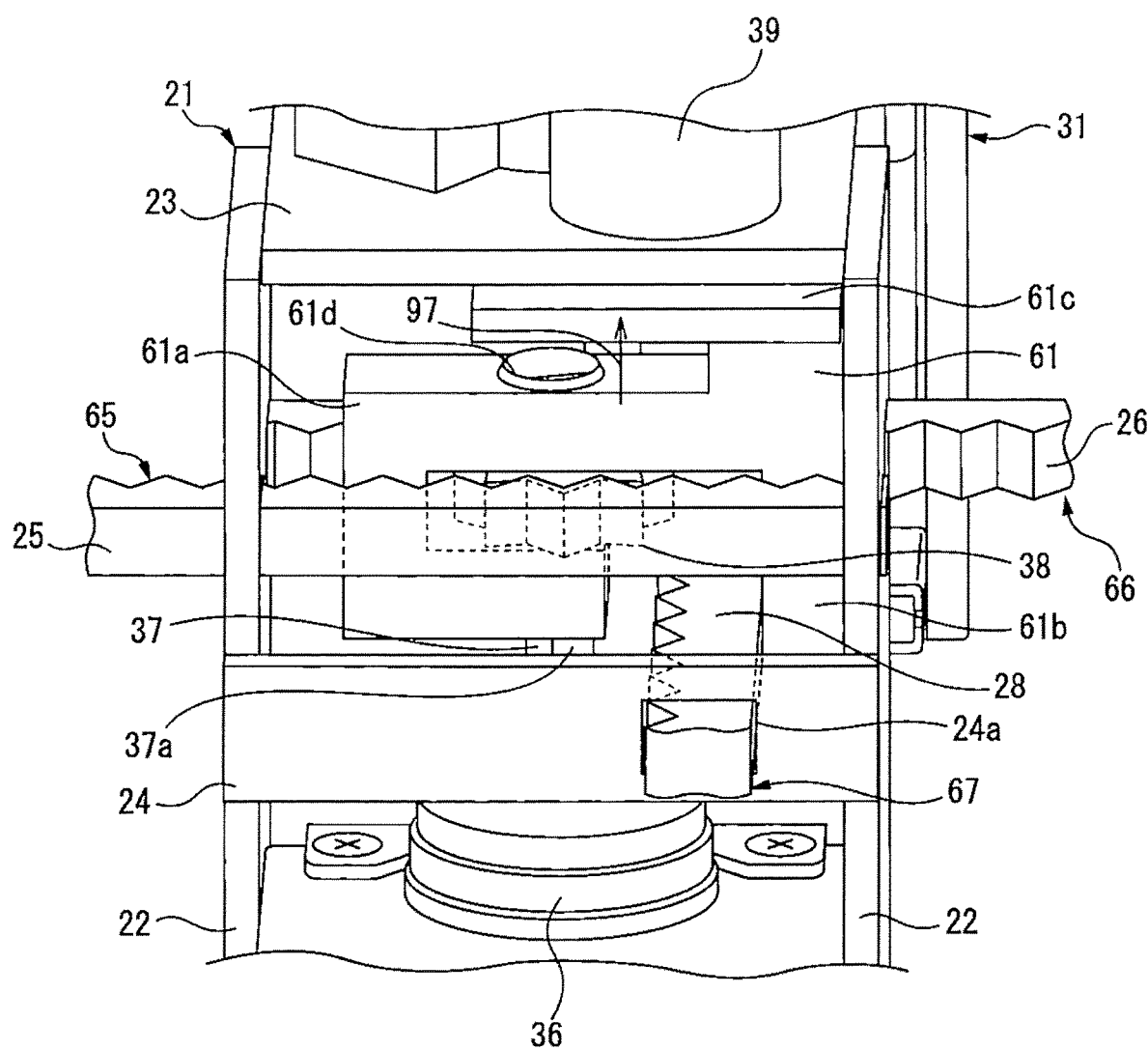
FIG. 8 is an enlarged perspective view of the operation tool when a gear is disposed at a first position.
Figure 9:
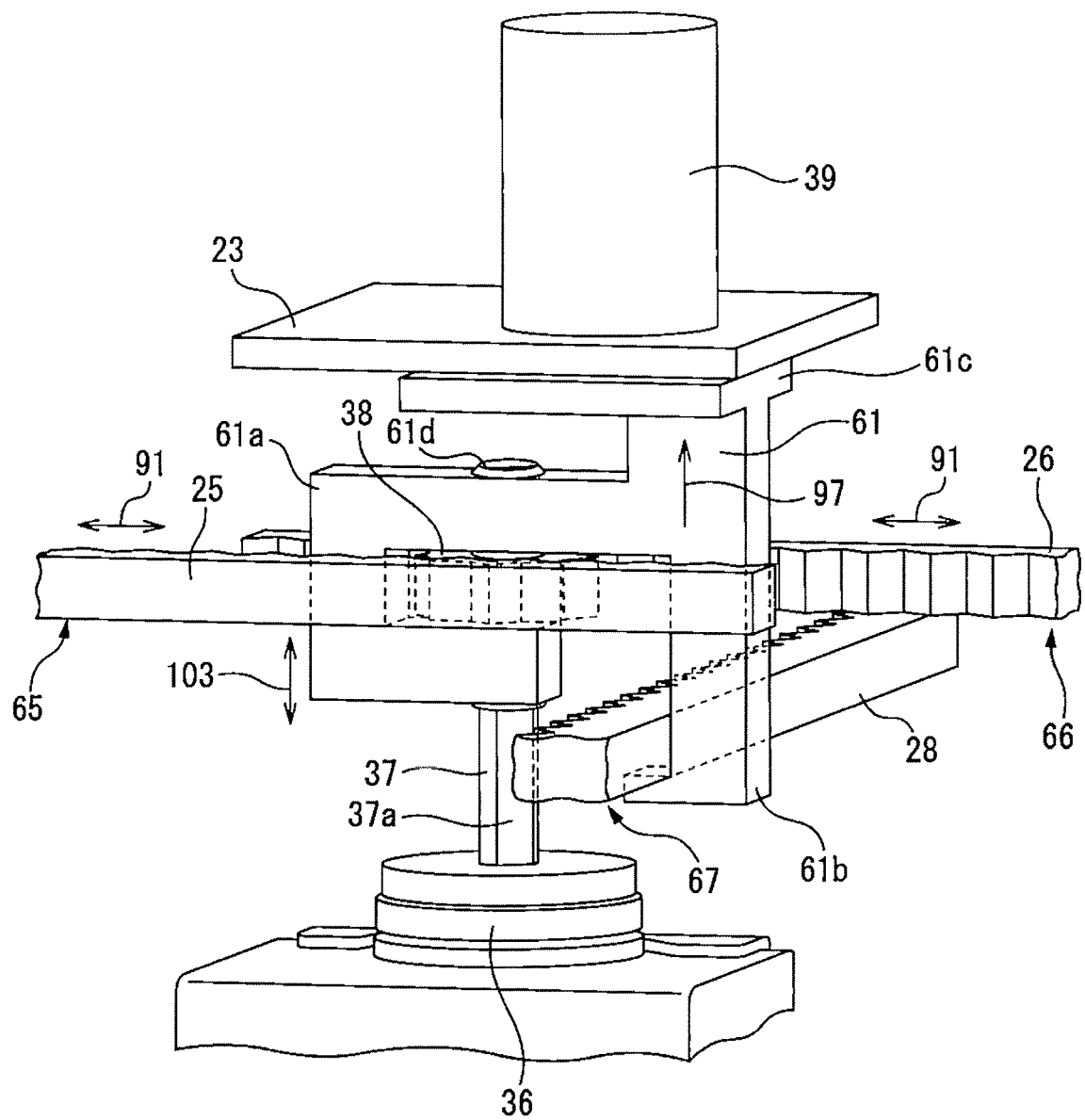
FIG. 9 is a perspective view illustrating a positional relationship between a movement member, the gear, and a plurality of arms when the gear is disposed at the first position.

Next, the function of the operation tool and the function of the robot apparatus of the present embodiment will be described in detail. FIG. 8 illustrates an enlarged perspective view of the operation tool when the gear is disposed at the first position. FIG. 9 illustrates a perspective view of the movement member, the gear, and a plurality of arms when the gear is disposed at the first position. In FIG. 9, the side plate 22 and the support plate 24 out of the frame body 21 are omitted for explanation, Referring to FIG. 8 and FIG. 9, the movement member 61 in the present embodiment includes an engagement part 61a for engaging with the gear 38. The engagement part 61a has a cross-sectional shape that is formed in a U-shape. The engagement part 61a of the present embodiment has a shape for sandwiching the gear 38.

The movement member 61 includes a first press part 61b that moves together with the engagement part 61a. The first press part 61b extends toward the rod-shaped member 28 of the third arm 67. The first press part 61b is connected to an end portion of the engagement part 61a. The first press part 61b has a leading end portion having an L-shaped cross-sectional shape. The first press part 61b presses and brakes the rod-shaped member 28 of the third arm 67, as described later.

The movement member 61 includes a second press part 61c that moves together with the engagement part 61a, The second press part 61c is connected to an end portion of the engagement part 61a, The second press part 61c is plate-shaped. The second press part 61c presses and brakes the rod-shaped member 25 of the first arm 65 and the rod-shaped member 26 of the second arm 66, as described later. The second press part 61c is coupled to the flange 71c of the gear moving cylinder 39. In the present embodiment, the engagement part 61a, the first press part 61b, and the second press part 61c are integrally formed.

In the example illustrated in FIG. 8 and FIG. 9, the first slide member 71 of the gear moving cylinder 39 is disposed at the most drawn position (see FIG. 4). The movement member 61 and the gear 38 are moved in the direction indicated by an arrow 97, The shaft 37 of the gear driving motor 36 is inserted through a hole 61d in the engagement part 61a.

The gear 38 engages with the first arm 65 and the second arm 66 when the gear 38 is disposed at the first position. The rod-shaped member 25 of the first arm 65 comes into contact with one side of the gear 38. Further, the rod-shaped member 26 of the second arm 66 comes into contact with the other side of the gear 38. The gear 38 meshes with the teeth that are formed in the rod-shaped members 25 and 26. With the gear driving motor 36 being driven, the first arm 65 and the second arm 66 move in directions opposite to each other. As the shaft 37 rotates in one direction, the press plate 27 of the first arm 65 and the press plate 27 of the second arm 66 move in directions approaching each other. Moreover, as the shaft 37 rotates in the other direction, the press plate 27 of the first arm 65 and the press plate 27 of the second arm 66 move in directions separating from each other. In this way, with the gear driving motor 36 being driven, the two press plates 27 facing each other are able to clamp and release the workpiece.

Incidentally, when the gear 38 is disposed at the first position, the first press part 61b presses the surface of the rod-shaped member 28 of the third arm 67. When the gear 38 is disposed at the first position, the movement member 61 moves in the direction indicated by the arrow 97. At this time, the first press part 61b presses the lower face of the rod-shaped member 28. By adopting this configuration, the movement of the third arm 67 is inhibited. The operation tool 2 of the present embodiment is formed such that the third arm 67 is subjected to braking when the first arm 65 and the second arm 66 move.

Figure 10:
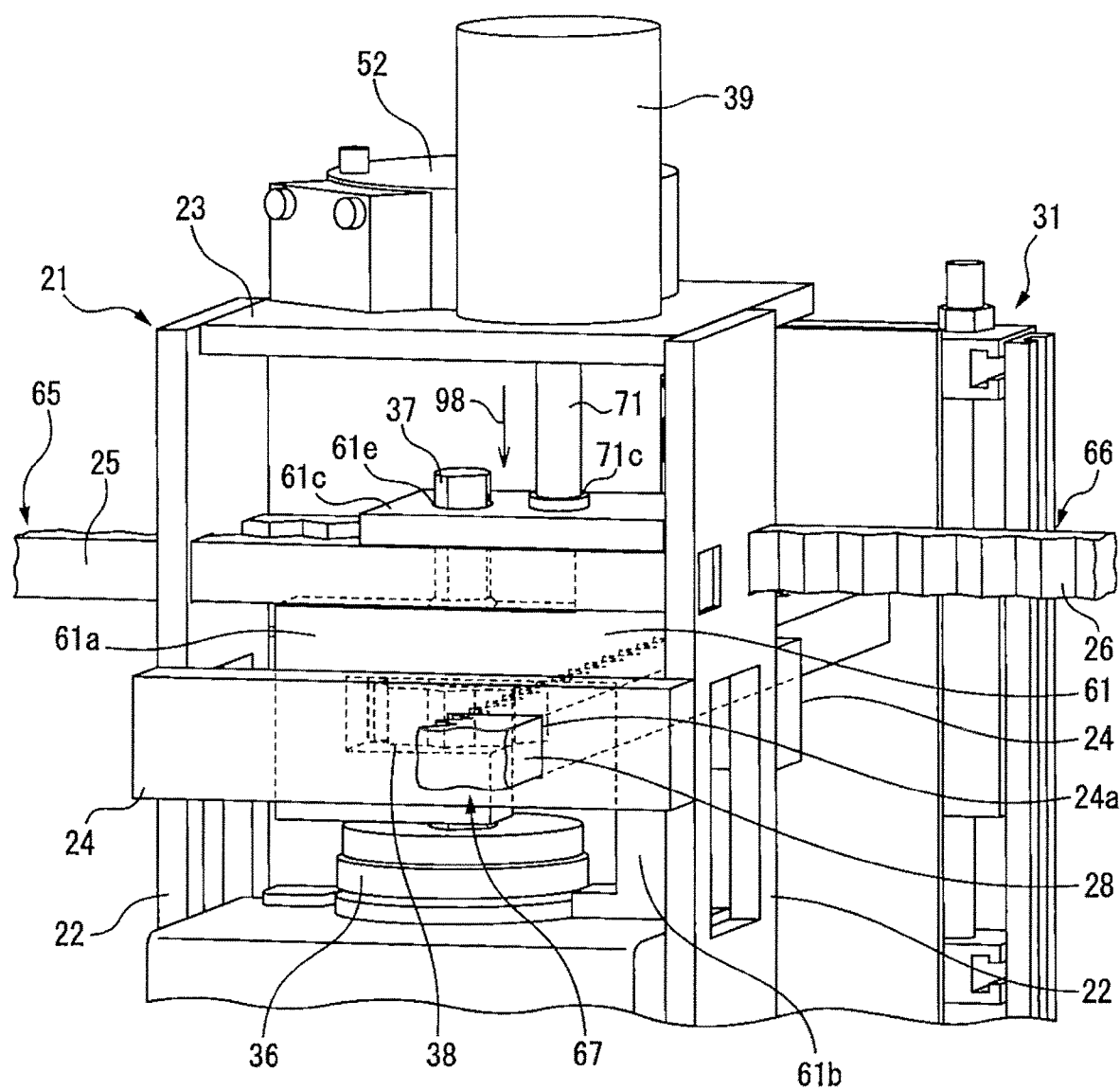
FIG. 10 is an enlarged perspective view of the operation tool when the gear is disposed at a second position.
Figure 11:
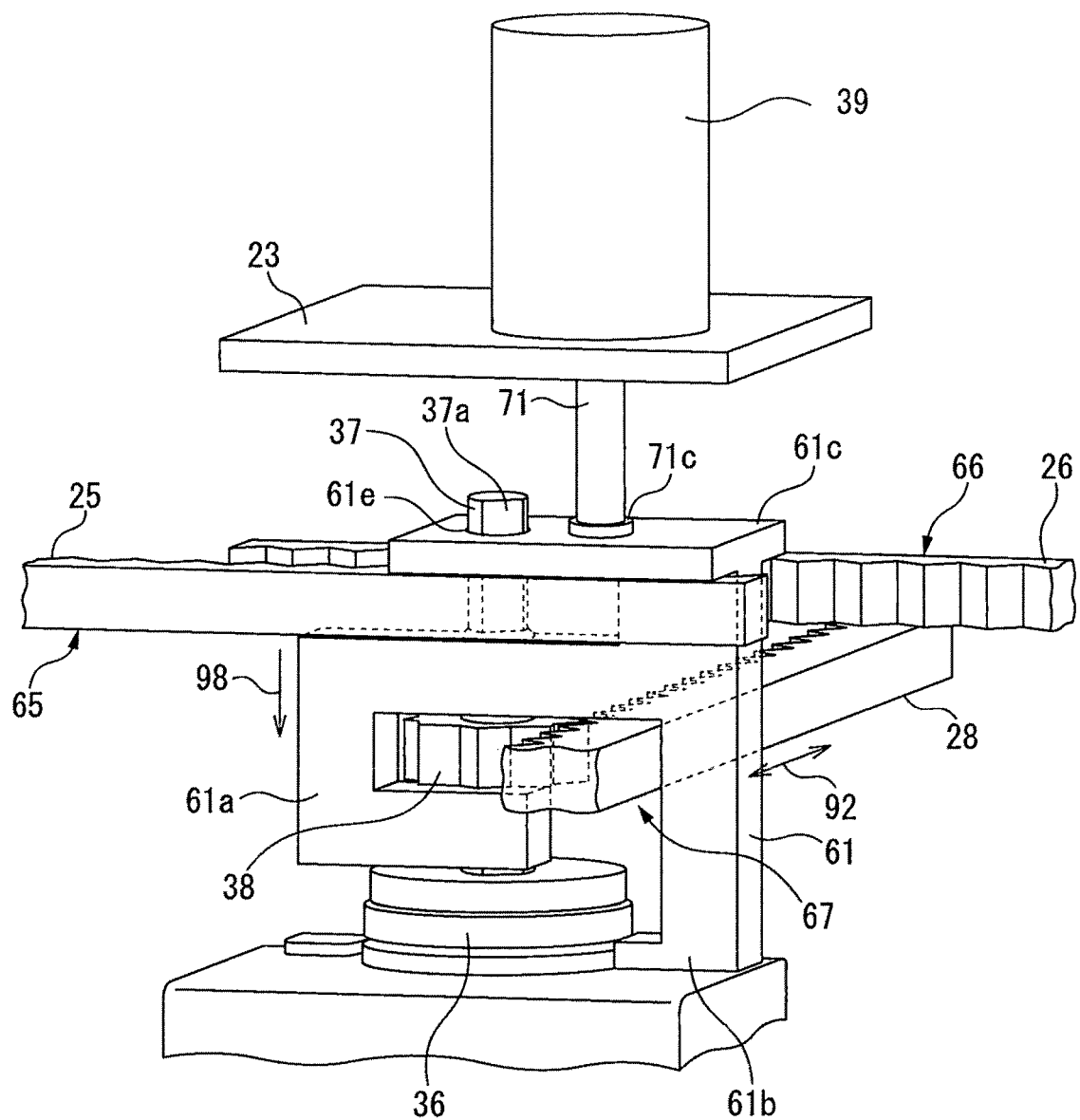
FIG. 11 is a perspective view illustrating a positional relationship between the movement member, the gear, and the plurality of arms when the gear is disposed at a second position.

FIG. 10 illustrates an enlarged perspective view of the operation tool when the gear is disposed at the second position. FIG. 11 illustrates a perspective view of the gear, the movement member, and the plurality of arms when the gear is disposed at the second position. Referring to FIG. 10 and FIG. 11, with the gear moving cylinder 39 being moved, the movement member 61 moves, as indicated by an arrow 98. The first slide member 71 of the gear moving cylinder 39 is disposed at the most protruding position (see FIG. 6). The shaft 37 of the gear driving motor 36 is inserted through a hole 61e that is formed through the second press part 61c.

The gear 38 is pressed by the engagement part 61a of the movement member 61 and moves to the second position. The gear 38 disengages from the first arm 65 and disengages from the second arm 66. The gear 38 engages with the rod-shaped member 28 of the third arm 67. The teeth of the gear 38 mesh with the teeth of the rod-shaped member 28.

When the gear 38 is at the second position, with the gear driving motor 36 being driven, the third arm 67 moves in the direction indicated by the arrow 92. On the other hand, when the movement member 61 moves in the direction indicated by the arrow 98, the second press part 61c presses the upper face of the rod-shaped member 25 of the first arm 65 and the upper face of the rod-shaped member 26 of the second arm 66. This allows the first arm 65 and the second arm 66 to be braked. As such, the operation tool 2 is formed such that the first arm 65 and the second arm 66 are subjected to braking when the third arm 67 moves.

Figure 12:
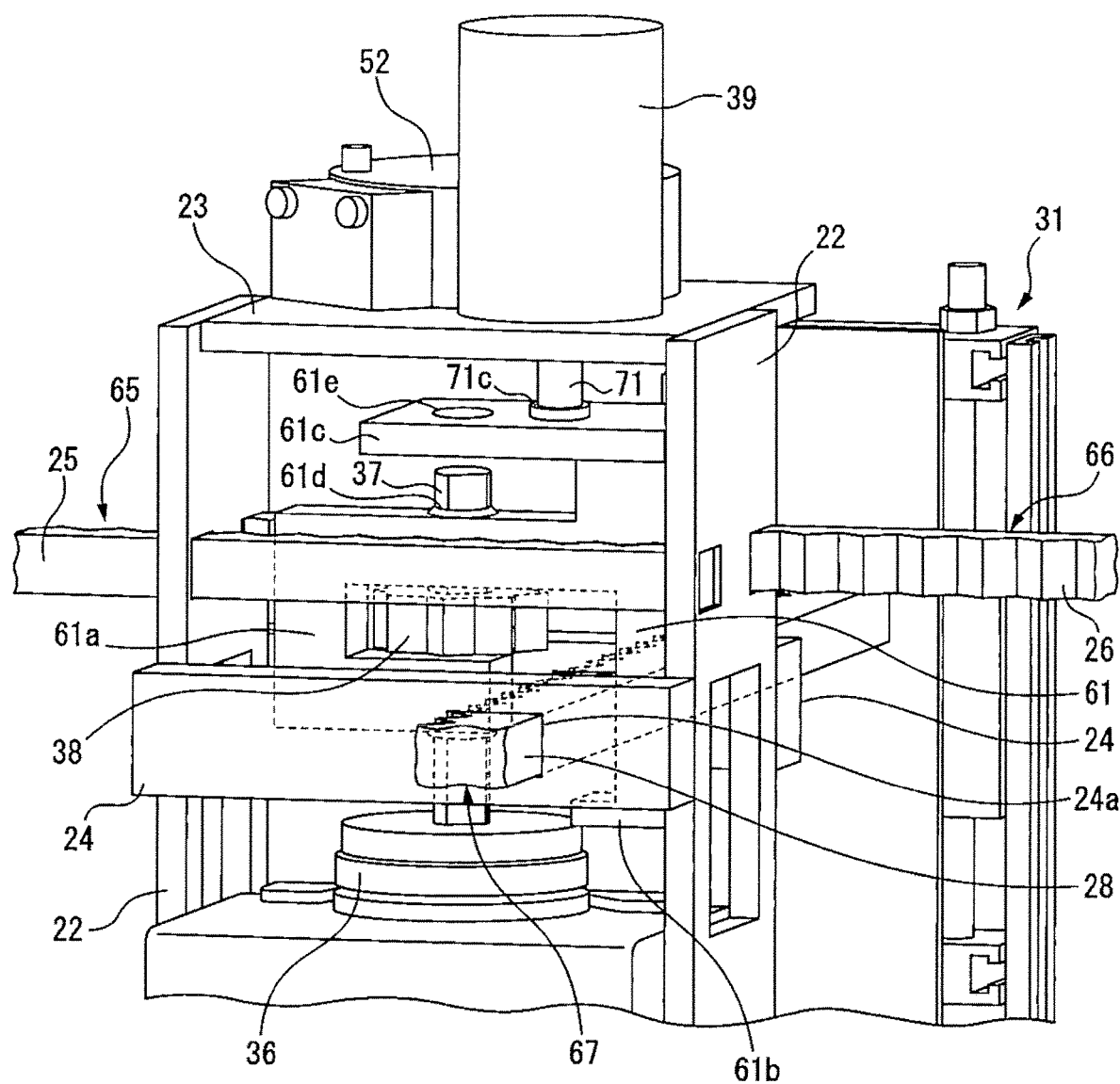
FIG. 12 is an enlarged perspective view of the operation tool when the gear is disposed at a third position.
Figure 13:
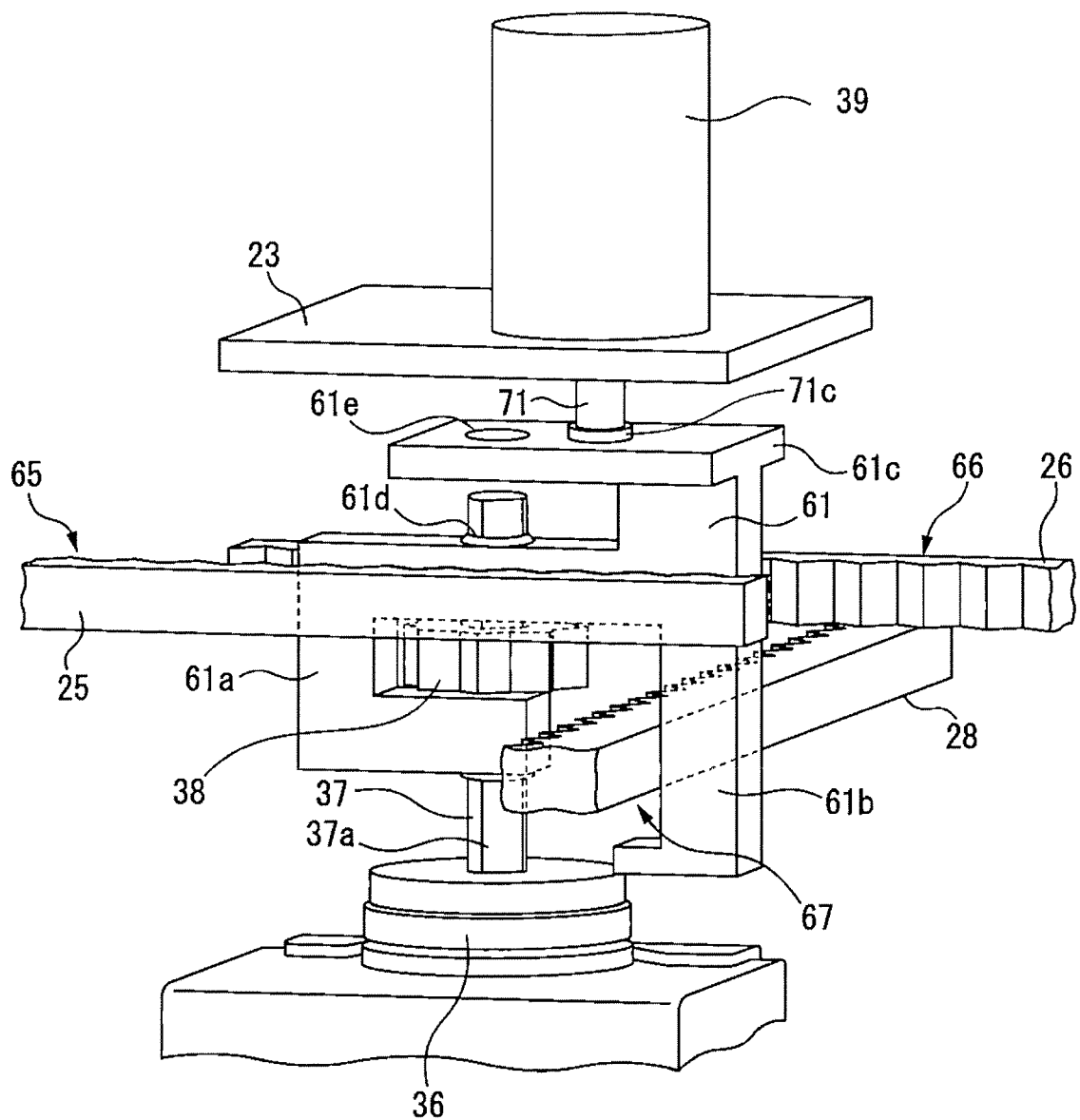
FIG. 13 is a perspective view illustrating a positional relationship between the movement member, the gear, and the plurality of arms when the gear is disposed at the third position.

FIG. 12 illustrates an enlarged perspective view of the operation tool when the gear is disposed at the third position. FIG. 13 illustrates a perspective view of the movement member, the gear, and the plurality of arms at the time when the gear is disposed at the third position. The first slide member 71 of the gear moving cylinder 39 is disposed at the middle position (see FIG. 5). Referring to FIG. 12 and FIG. 13, with the gear moving cylinder 39 being driven, the gear 38 is disposed at the third position. The third position is a middle position between the first position and the second position.

When the gear 38 is disposed at the third position, the gear 38 disengages from all of the rod-shaped members 25, 26, and 28. That is, the gear 38 is separated from all of the arms 65, 66, and 67. In addition, the first press parts 61b is separated from the rod-shaped member 28, and the second press parts 61c is separated from the rod-shaped members 25 and 26. This allows the respective arms 65, 66, and 67 to be in a state of free movement.

Figure 14:
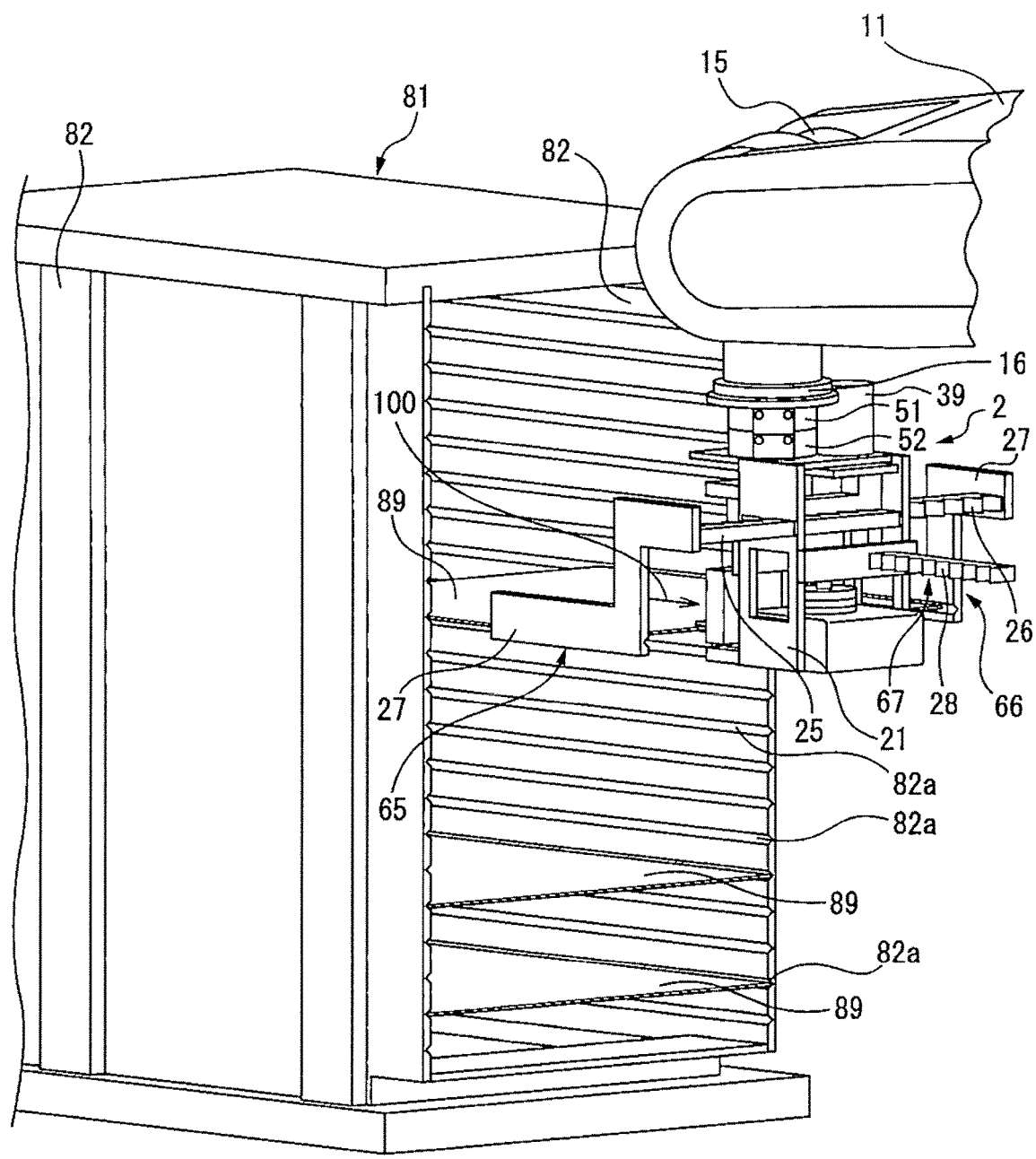
FIG. 14 is a perspective view of a shelf and the robot apparatus when the robot apparatus extracts a workpiece from the shelf.

Next, an operation of the robot apparatus in the present embodiment will be described. FIG. 14 illustrates a perspective view of a shelf, in which the workpiece in the present embodiment is stored, and the robot apparatus. The robot apparatus 5 of the present embodiment performs an operation of extracting a workpiece 89 from a shelf 81, in which the workpiece 89 is stored, and moving the workpiece 89 to another position.

The workpiece 89 of the present embodiment is a plate-shaped substrate. The shelf 81 includes side plates 82 facing each other. The inner side surface of the side plate 82 is formed with grooves 82a extending in the horizontal direction. The grooves 82a is formed so as to reach an end portion of the side plate 82. The grooves 82a on one side of the side plate 82 and the grooves 82a on the other side of the side plate 82 are formed at mutually opposing positions. The end portions on the both sides of the workpiece 89 are inserted into the grooves 82a whereby the workpiece 89 is supported by the grooves 82a. The operation tool 2 of the present embodiment performs an operation of clamping the workpiece 89 supported by the grooves 82a and drawing the workpiece 89 from the grooves 82a.

Figure 15:
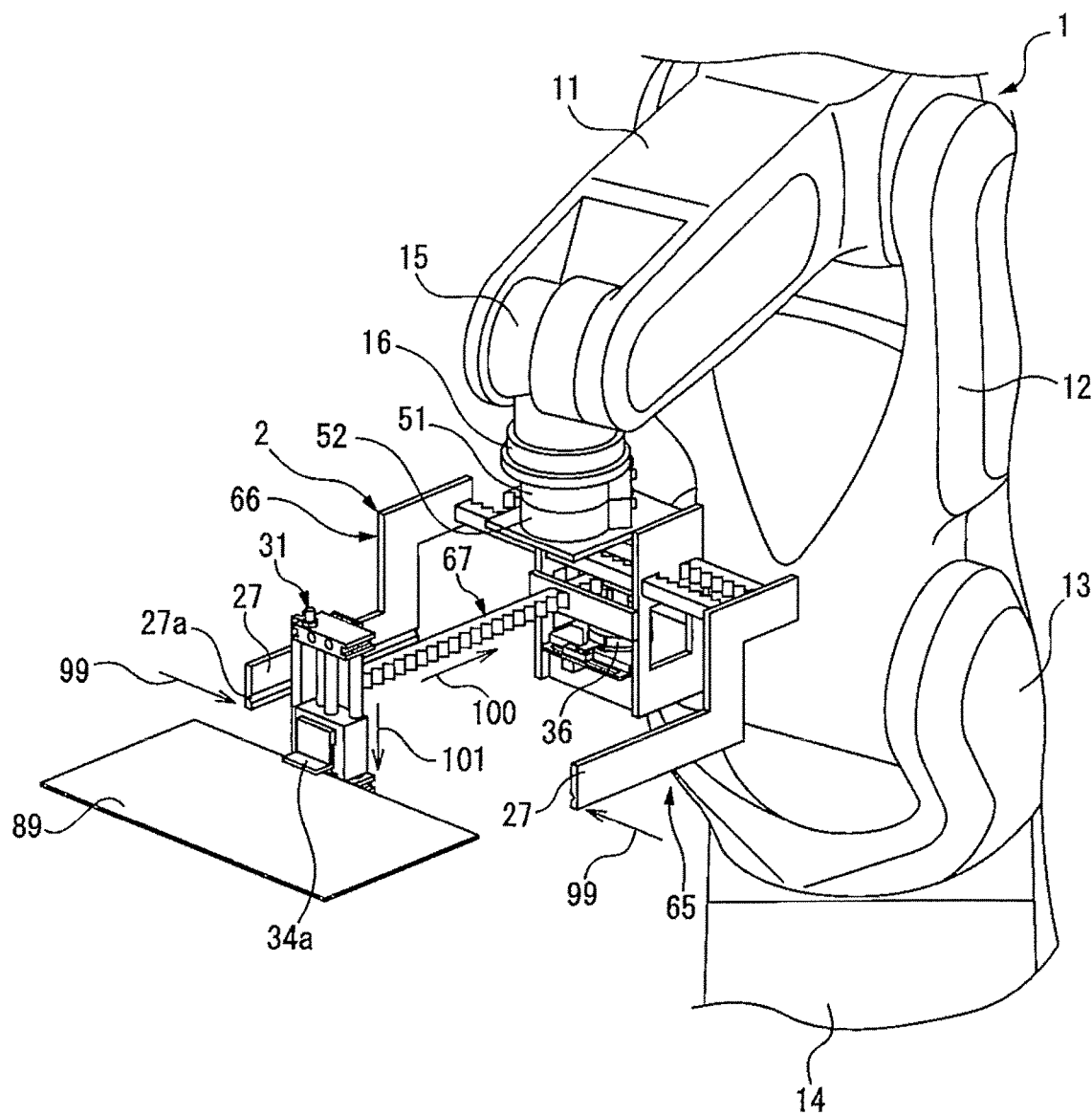
FIG. 15 is a perspective view of the robot apparatus and a workpiece for explaining a first step in which the robot apparatus extracts the workpiece from the shelf.

FIG. 15 illustrates a perspective view of the robot apparatus for explaining a first step of operation. Referring to FIG. 7, FIG. 14, and FIG. 15, the operation control unit 43 drives the gear moving cylinder 39 in order to dispose the gear 38 at the first position. The gear 38 engages with the first arm 65 and the second arm 66. The third arm 67 is braked. The operation control unit 43 drives the gear driving motor 36 in order to move the first arm 65 and the second arm 66, as indicated by an arrow 99, The operation control unit 43 adjusts a distance between the press plate 27 of the first arm 65 and the press plate 27 of the second arm 66 so as to make the distance correspond to a longitudinal length of the workpiece 89.

The operation control unit 43 changes the position and the orientation of the robot 1 such that the groove 27a formed in each of the press plates 27 is collinear with each of the grooves 82a formed in the side plate 82 of the shelf 81. Next, the operation control unit 43 drives the gear moving cylinder 39 in order to move the gear 38 to the second position. The gear 38 engages with the third arm 67, The first arm 65 and the second arm 66 are braked. The operation control unit 43 drives the gear driving motor 36 in order to move the third arm 67 toward the workpiece 89, The operation control unit 43 moves the third arm 67 to a position at which the clamping device 31 can clamp the workpiece 89.

Figure 16:
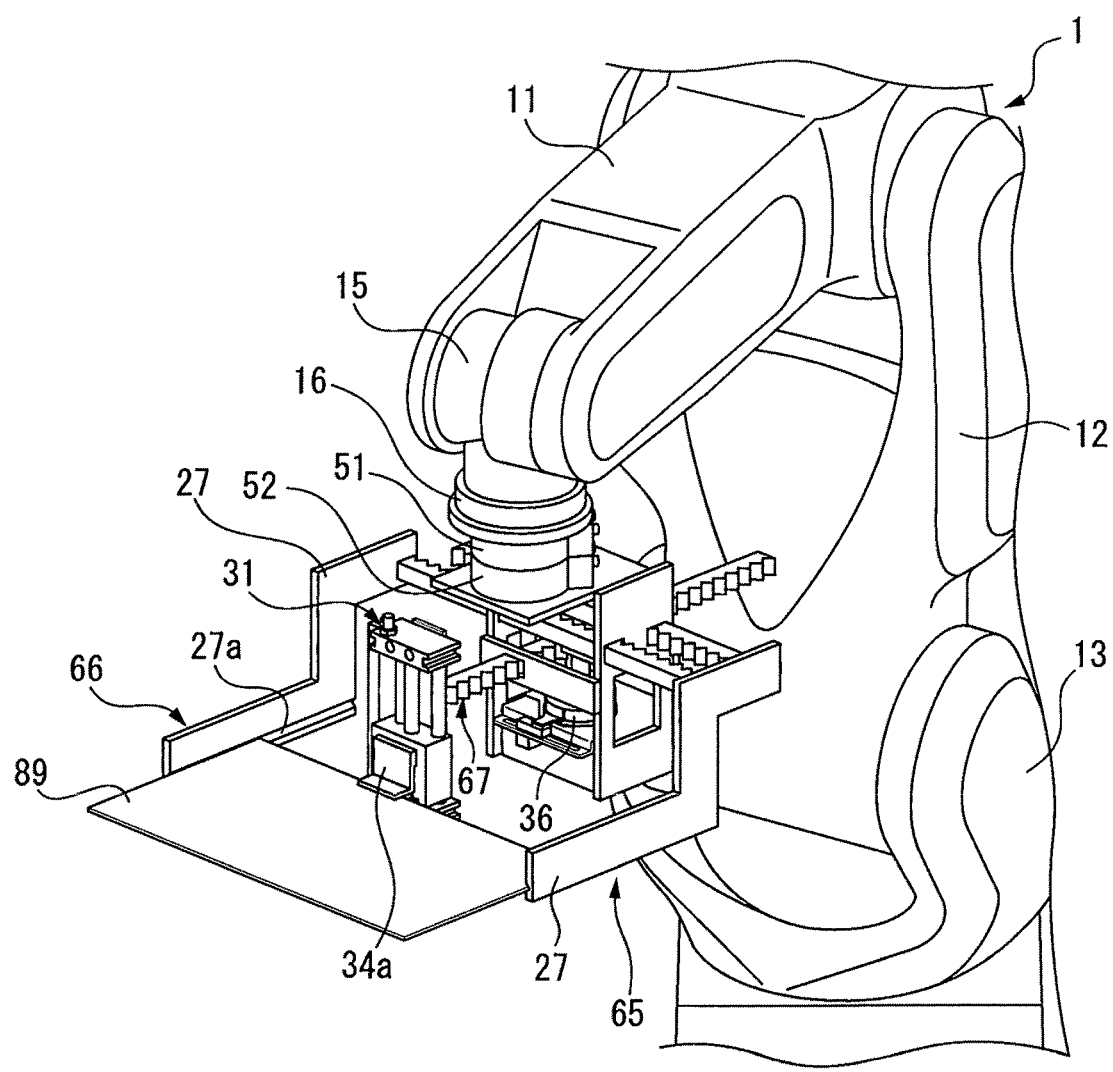
FIG. 16 is a perspective view of the robot apparatus and the workpiece for explaining a second step in which the robot apparatus extracts the workpiece from the shelf.

Next, the operation control unit 43 drives the claw part driving cylinder 33 so as to move the claw part 34a toward the claw part 34b, as indicated by an arrow 101, The workpiece 89 is clamped by the claw part 34a and the claw part 34b, Next, the operation control unit 43 drives the gear driving motor 36 so as to perform an operation of drawing the third arm 67, as indicated by an arrow 100. The workpiece 89 moves from the grooves 82a of the shelf 81 to the grooves 27a of the press plates 27 of the arms 65 and 66, FIG. 16 illustrates a perspective view of the robot apparatus for explaining a second step of operation. FIG. 16 illustrates a state where the gripping of the workpiece is completed. The operation control unit 43 moves the third arm 67 to a predetermined position. The operation control unit 43 then stops the rotation of the shaft 37 of the gear driving motor 36. The operation control unit 43 continues the excitation of the gear driving motor 36 so as to maintain the position of the third arm 67. In this way, the operation tool 2 can grip the workpiece 89.

Next, the operation control unit 43 changes the position and the orientation of the robot 1 so as to convey the workpiece 89 to a desired position. Then, the operation control unit 43, when releasing the workpiece 89, drives the gear driving motor 36 such that the third arm 67 moves in the protruding direction, for example. The workpiece 89 disengages from the first arm 65 and the second arm 66. The operation control unit 43 subsequently allows the claw part 34a of the clamping device 31 to move, thereby releasing the workpiece 89.

Note that in the above-described embodiment, an operation of drawing the workpiece 89 by the third arm 67 is performed after adjusting the distance between the press plate 27 of the first arm 65 and the press plate 27 of the second arm 66, but the embodiment is not limited to this. The respective arms can move in any order. For example, the workpiece may be clamped between the first arm and the second arm after the workpiece is slightly drawn out from the shelf by the third arm.

Further, the operation tool of the present embodiment is formed so as to grip the plate-shaped workpiece, but the embodiment is not limited to this. The operation tool may be formed so as to grip a workpiece of any shape. For example, the press plate of each arm may be formed in a shape corresponding to the shape of the workpiece. Moreover, the claw part of the clamping device may be formed in a shape corresponding to the shape of a portion, which is to be clamped to the workpiece.

In the operation tool 2 of the present embodiment, the gear 38 is formed to be movable in order to engage with a plurality of arms 65, 66, and 67. The arms 65 and 66 which clamp the workpiece 89 from the both sides thereof and the arm 67 which engages with the workpiece 89 from another direction are moved by one gear driving motor 36. The operation tool 2 of the present embodiment makes it possible to reduce the number of rotary machines for driving the arms. This eliminates the need to dispose a first motor for driving arms for clamping the both sides of the workpiece and a second motor for driving the arm for engaging with the workpiece from another direction, and this makes it possible to cause one motor to drive three arms. This allows the operation tool to be lightweight. As a result, the operation tool 2 can be operated by a robot of a small size.

Moreover, the operation tool 2 of the present embodiment allows the arms 65 and 66 for clamping the workpiece 89 and the arm 67 for gripping the workpiece 89 to move individually. Hence, the operation tool 2 can grip workpieces of various sizes. In this way, the operation tool of the present embodiment is lightweight and can grip workpieces of various sizes.

Further, in the present embodiment, the rotation member is disposed at the third position, which is between the first position and the second position. In the third position, the rotation member is separated from all of the arms. When the arm being in contact with the rotation member is switched, the rotation member is disengaged from one arm and then engaged with another arm. When the rotation member changes the arm to engage therewith, the rotation member passes through a position separated from all of the arms thereby implementing switch over of the arms smoothly.

Referring to FIG. 7, the robot controller 4 in the present embodiment functions as a controller for controlling the gear driving motor 36. The operation tool 2 includes a position detector 35 for detecting a rotation angle of the gear driving motor 36. The position detector 35 can be configured by an encoder or the like. The storage unit 42 of the robot controller 4 can store information relating to the control of the gear driving motor 36. The robot controller 4 can detect the positions of the respective arms 65, 66, and 67 of the operation tool 2 on the basis of the output from the position detector 35.

The position detector 35 of the present embodiment detects the rotation angle of the gear driving motor 36, but the embodiment is not limited to this. As the position detector, any detector for detecting positions of respective arms may be employed. For example, the positions of the respective arms of the operation tool may be detected by disposing a linear scale.

The robot controller 4 includes a signal processing unit 46 for controlling the gear driving motor 36. The CPU as the processor acquires the operation program 41 and performs control defined in the operation program 41, thus functioning as the signal processing unit 46. The gear 38, when moving from the first position to the second position, passes through the third position. The position detector 35, when the gear 38 moves from the first position to the third position, detects a rotation angle of the gear driving motor 36. The signal processing unit 46 acquires the rotation angle from the position detector 35 and stores the rotation angle in the storage unit 42, The gear moving cylinder 39 subsequently moves the gear 38 from the first position to the second position.

Next, the gear moving cylinder 39, when the gear 38 moves from the second position to the first position, stops the gear 38 at the third position. The signal processing unit 46 acquires from the storage unit 42 the rotation angle of the gear driving motor 36 when the gear 38 moves from the first position toward the second position. The signal processing unit 46 sends the rotation angle to the operation control unit 43. The operation control unit 43 controls the gear driving motor 36 so as to implement the rotation angle received from the signal processing unit 46, The gear moving cylinder 39 subsequently moves the gear 38 from the third position to the first position.

Similarly to the above-described control, the position detector 35, when the gear 38 moves from the second position to the first position, detects a rotation angle of the gear driving motor 36. The storage unit 42 stores the rotation angle of the gear driving motor 36. The gear moving cylinder 39 subsequently moves the gear 38 from the second position to the first position.

Next, the gear moving cylinder 39, when the gear 38 moves from the first position to the second position, stops the gear 38 at the third position. The signal processing unit 46 acquires, from the storage unit 42, the rotation angle of the gear driving motor 36 at a time when the gear 38 moves from the second position to the first position. The operation control unit 43 controls the rotation angle of the gear driving motor 36 so as to implement the rotation angle received from the signal processing unit 46. Next, the gear moving cylinder 39 moves the gear 38 from the third position to the second position.

In this way, the signal processing unit 46, when the gear 38 is separated from the arm, detects the rotation angle of the gear driving motor 36. Then, when the gear 38 re-engages with the arm, a control for returning the rotation angle of the gear driving motor 36 to the rotation angle at the time when the gear 38 is separated from the arm is performed. By performing this control, the gear 38 is engaged at the original position of the rod-shaped member of the arm. This allows the positions of the respective arms 65, 66, and 67 to be detected on the basis of the rotation angles of the gear driving motor 36. This also makes it possible to avoid the gear 38 from being immobilized by failure in meshing between the teeth of the gear 38 and the teeth of the rod-shaped members 25, 26, and 28. Moreover, the gear 38 can be caused to smoothly move from the third position to the first position or from the third position to the second position.

In the above-described embodiment, the rotation member that comes into contact with each arms is configured of a gear, but the embodiment is not limited to this. For example, a ball screw mechanism may be employed in order to move each arm. Alternatively, as the rotation member, a circular plate may be employed. An anti-slip member, e.g., rubber may then be affixed to the circumferential surface of the circular plate. The anti-slip member, e.g., rubber may also be disposed on the rod-shaped member that comes into contact with the rotation member. A urethane rubber may be used as the rubber of the anti-slip member, for example. This configuration also allows the rotation member to rotate in contact with the rod-shaped member of the arm, thereby causing the arm to move.

Further, in the above-described embodiment, the movement member 61 includes the first press part 61b for pressing the third arm 67 when the gear 38 is disposed at the first position, and the second press part 61c for pressing the first arm 65 and the second arm 66 when the gear 38 is disposed at the second position. By adopting this configuration, the arm that does not move by the gear driving motor 36 can be braked with a simple configuration.

Figure 17:
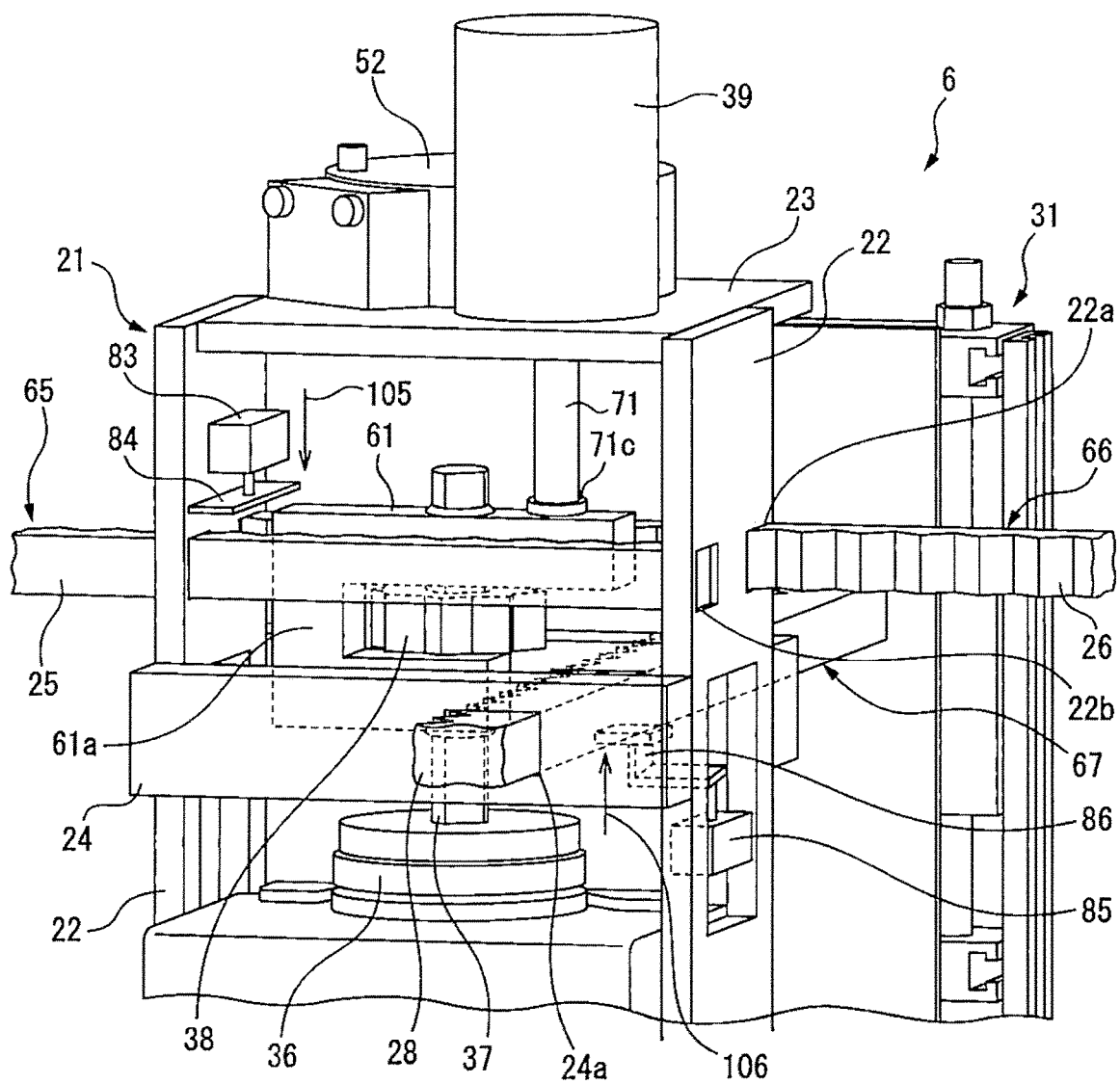
FIG. 17 is an enlarged perspective view of an operation tool as a second gripping device in the embodiment.

FIG. 17 is an enlarged perspective view of the operation tool as a second gripping device in the present embodiment. In the operation tool 6 as the second gripping device, the movement member does not have the function of braking the arms 65, 66, and 67. A brake device for braking the arms is disposed to the operation tool 6. The movement member 61 of the operation tool 6 includes the engagement part 61a, but does not include the first press part and the second press part.

The flange 71c disposed at the leading end of the first slide member 71 of the gear moving cylinder 39 is fixed to the engagement part 61a.

A brake device for braking the first arm 65 and the second arm 66 is disposed to the one side plate 22 of the frame body 21. The brake device includes a cylinder 83 fixed to the side plate 22 and a brake member 84 fixed to the piston rod of the cylinder 83. With the cylinder 83 being driven, the brake member 84 moves toward the rod-shaped members 25 and 26, as indicated by an arrow 105. The brake member 84 presses the rod-shaped members 25 and 26, whereby the first arm 65 and the second arm 66 can be braked.

Further, a brake device for braking the third arm 67 is disposed to the other side plate 22 of the frame body 21. The brake device includes a cylinder 85 fixed to the side plate 22 and a brake member 86 fixed to the piston rod of the cylinder 85. With the cylinder 85 being driven, the brake member 86 moves toward the rod-shaped member 28, as indicated by an arrow 106. The brake member 86 presses the rod-shaped member 28 whereby the third arm 67 can be braked.

As such, a device for braking the respective arms 65, 66, and 67 at any time may be disposed. By adopting this configuration, the respective arms can be braked at any time. For example, by braking all of the arms 65, 66, and 67 when moving the gear 38, the gear 38 can move in a stable manner.

Figure 18:
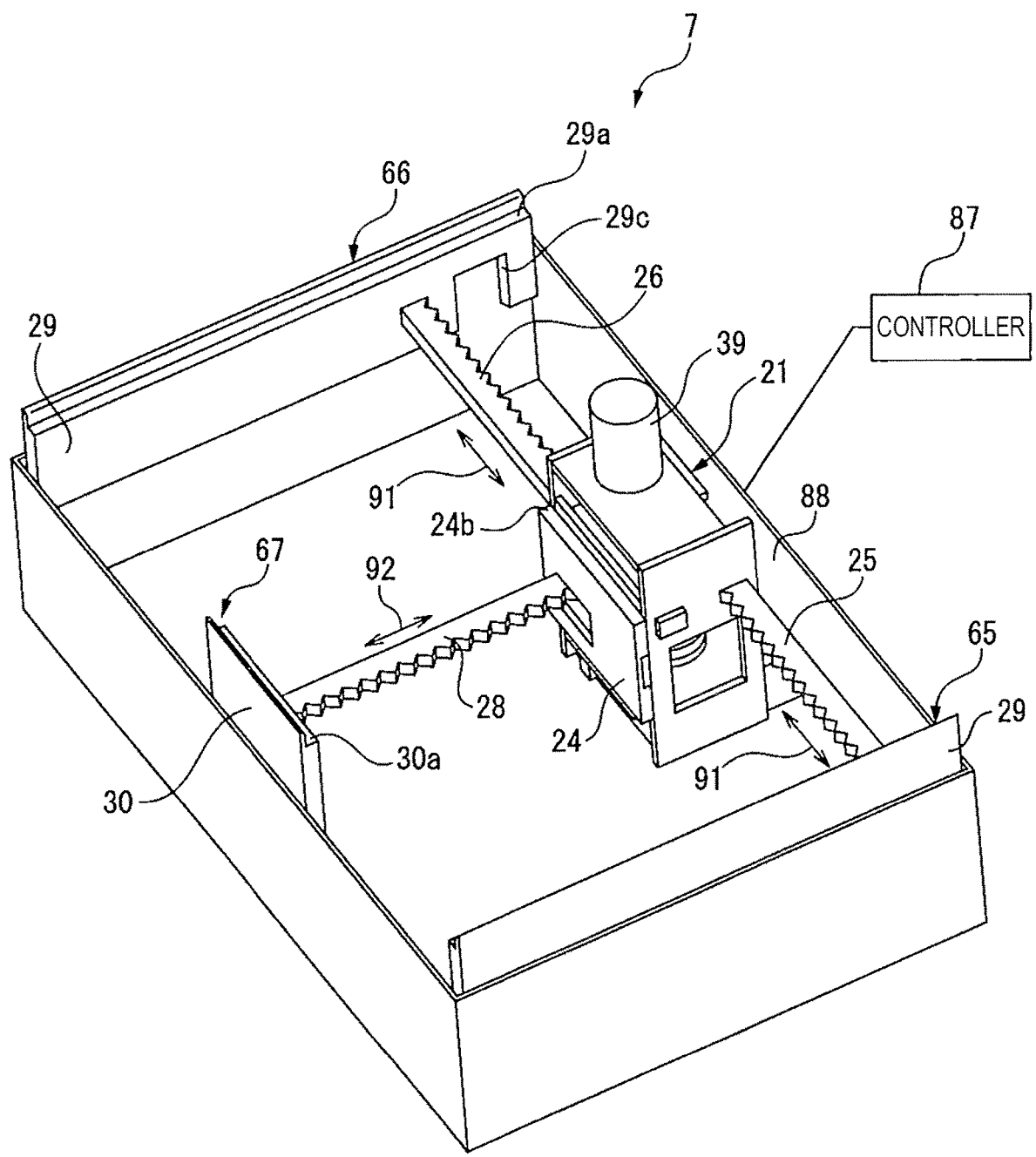
FIG. 18 is a perspective view of a third gripping device in the embodiment.

FIG. 18 illustrates a perspective view of a third gripping device in the present embodiment. A third gripping device 7 can be fixed to any device. For example, the third gripping device 7 can be fixed on a work stand or fixed to a conveyor. Alternatively, the third gripping device 7 can be fixed to a table or the like of a machine tool. The third gripping device 7 can also be disposed on a device that needs to grip a workpiece. For example, the third gripping device 7 can be disposed on a device for performing laser engraving, a coating device for forming a film on a surface of a workpiece, a device for placing a component on a surface of a substrate, and the like.

The gripping device 7 includes a support member 88 for supporting the frame body 21. The support member 88 has a box shape. A tool-side plate for coupling to a robot is not disposed to the gripping device 7. In the gripping device 7, the respective press plates 29 of the first arm 65 and the second arm 66 differ in shape from the press plates 27 of the operation tools 2 and 6. Further, in the third arm 67, a press plate 30 is disposed to the leading end of the rod-shaped member 28. The upper portions of the respective press plates 29 and 30 are formed with cutouts 29a and 30a such that the workpiece can be placed thereon. Also, the upper portion of the support plate 24 that is disposed on the front side of the frame body 21 is formed with a cutout 24b such that the workpiece can be placed thereon. The respective press plates 29 are also formed with pass-through parts 29c such that the rod-shaped members 25 and 26 of the arms 65 and 66 are inserted therethrough when the arms 65 and 66 move.

Figure 19:
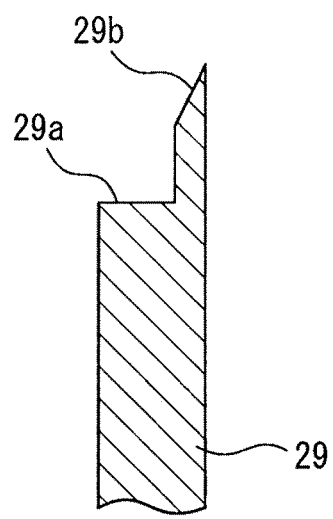
FIG. 19 is a cross-sectional view of a press plate of the third gripping device in the embodiment.

FIG. 19 illustrates a cross-sectional view of the press plate of the third gripping device. The cutout 29a of the press plate 29 has a cross-sectional shape that is formed in an L-shape. The leading end portion of the press plate 29 is formed with an inclined portion 29b having an inclined inner surface. When placing a workpiece, even if the position of the workpiece is slightly displaced, the workpiece can be moved into the cutout 29a by the inclined portion 29b. The leading end portions of the press plate 30 and the support plate 24 have the same shape as the leading end portion of the press plate 29.

Referring to FIG. 18, the gripping device 7 includes a controller 87. The controller 87 is configured of an arithmetic processing device (computer) including a CPU as a processor, a RAM, and the like. The gear driving motor 36 and the gear moving cylinder 39 are controlled by the controller 87. Similarly to the robot controller 4, the controller 87 includes the storage unit 42, the operation control unit 43, a gripping device driving unit corresponding to the operation tool driving unit 44, and the signal processing unit 46. Moreover, the gripping device 7 includes a position detector 35 for detecting the rotation angle of the gear driving motor 36 (see FIG. 7).

Figure 20:
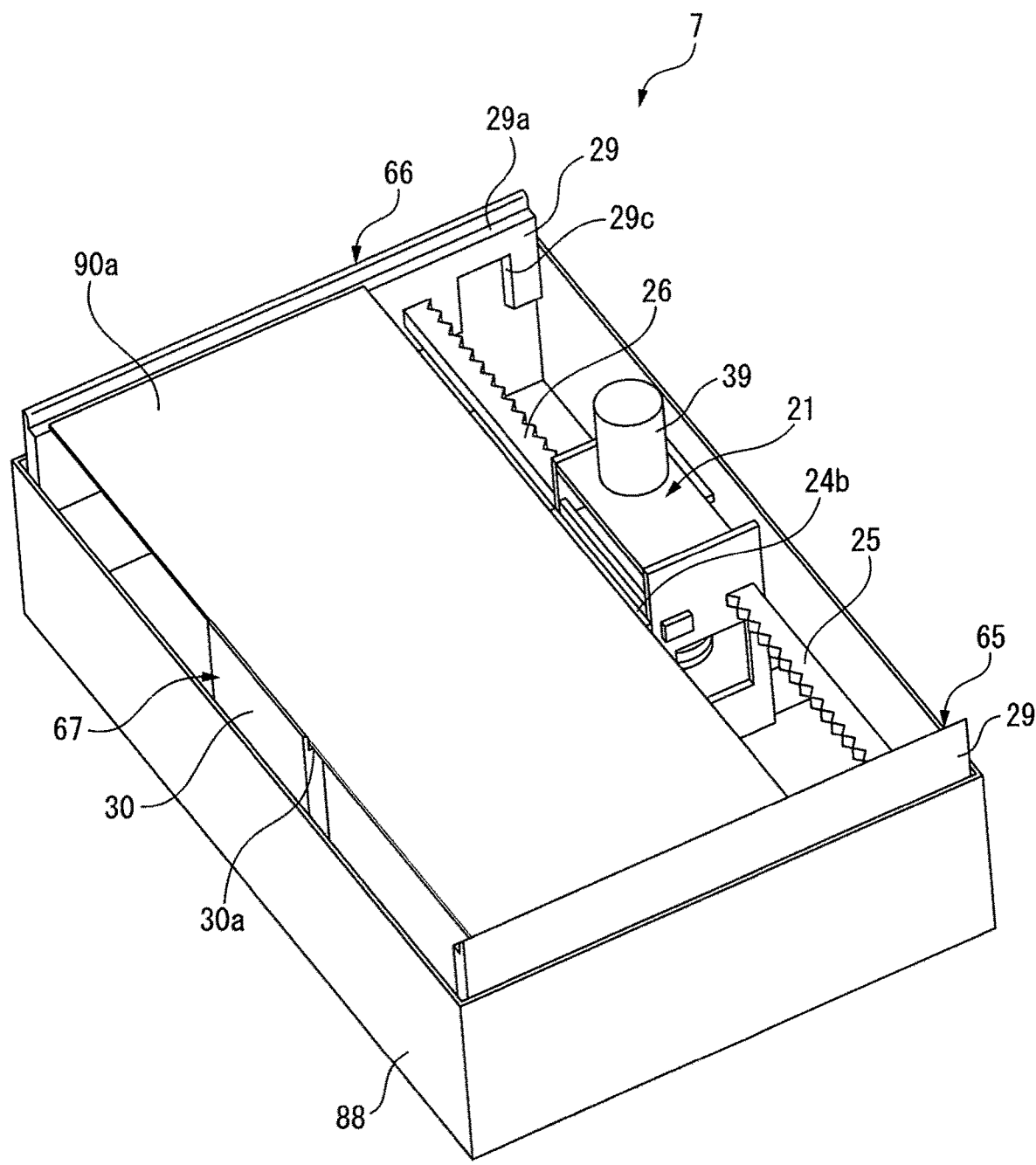
FIG. 20 is a perspective view of the third gripping device when gripping a workpiece of a large size.

FIG. 20 illustrates a perspective view of the third gripping device when gripping a workpiece of a large size. A workpiece 90a is placed on the cutouts 29a and 30a of the respective press plates 29 and 30 and the cutout 24b of the support plate 24. The workpiece 90a can be clamped in the longitudinal direction between the cutout 29a of the press plate 29 of the first arm 65 and the cutout 29a of the press plate 29 of the second arm 66. The workpiece 90a can also be clamped in the width direction between the cutout 30a of the press plate 30 of the third arm 67 and the cutout 24b of the support plate 24. In this way, the workpiece 90a can be gripped by clamping the workpiece 90a from directions different from each other.

When gripping the workpiece 90a, the controller 87 moves the first arm 65 and the second arm 66 such that the distance between the cutouts 29a of the respective press plates 29 of the arms 65 and 66 corresponds to the length of the workpiece 90a in the longitudinal direction. The controller 87 also moves the third arm 67 such that the distance between the cutout 30a of the press plate 30 and the cutout 24b of the support plate 24 corresponds to the length of the workpiece 90a in the width direction. Next, the workpiece 90a can be placed on the cutouts 29a, 30a, and 24b by a robot, operator, or the like. The workpiece 90a is gripped in a region surrounded by the cutouts 29a, 30a, and 24b. The gripping device 7 can grip the workpiece by clamping the workpiece from two directions different from each other.

Figure 21:
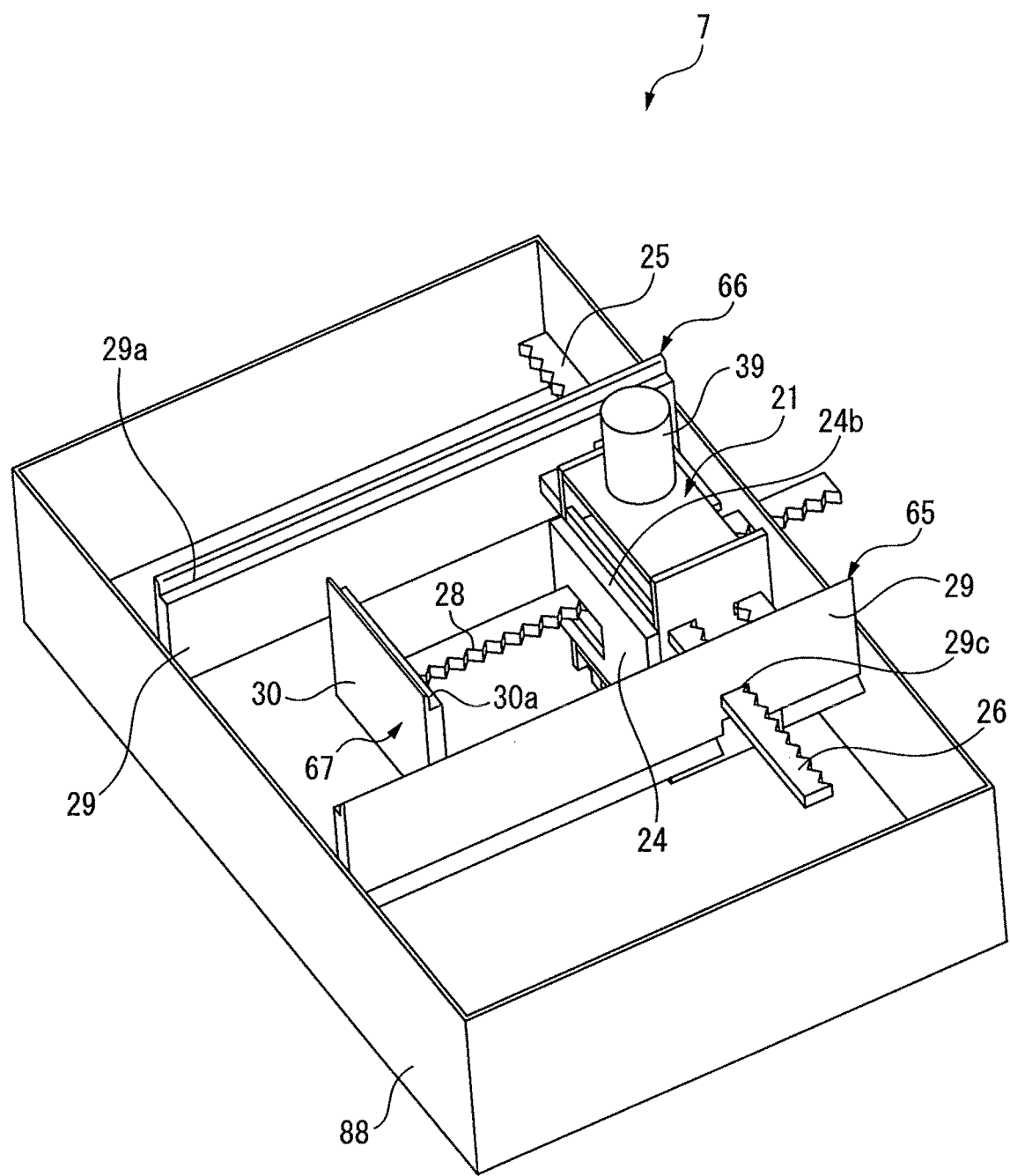
FIG. 21 is a perspective view illustrating another state of the third gripping device.
Figure 22:
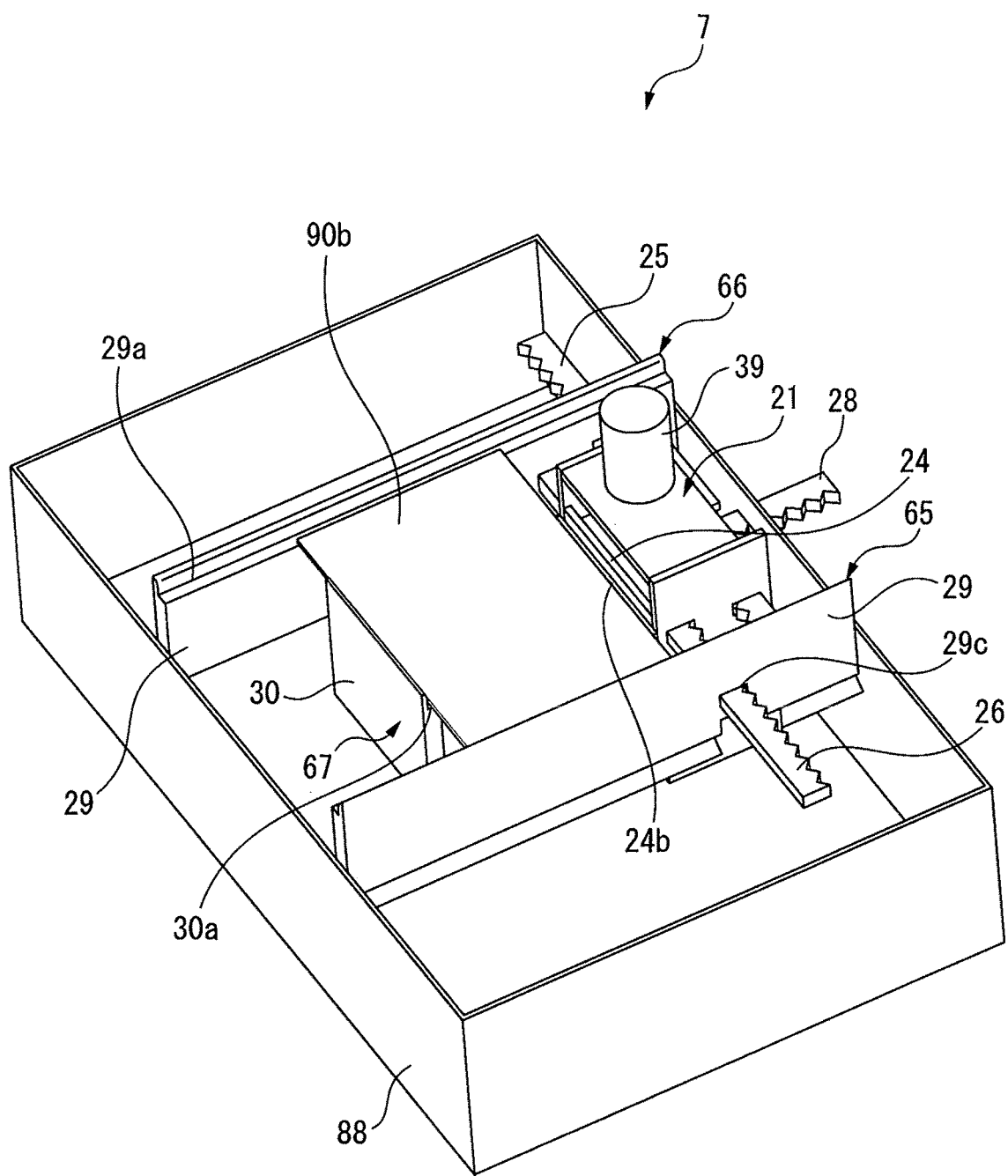
FIG. 22 is a perspective view of the third gripping device when gripping a workpiece of a small size.

FIG. 21 illustrates another perspective view of the third gripping device in the present embodiment. FIG. 22 illustrates a perspective view of the third gripping device when gripping a workpiece of a small size. In the example illustrated in FIG. 21 and FIG. 22, the distance between the press plate 29 of the first arm 65 and the press plate 29 of the second arm 66 is narrowed. Further, the distance between the press plate 30 of the third arm 67 and the support plate 24 is narrowed. The rod-shaped member 26 of the second arm 66 passes through the pass-through part 29c that is formed in the press plate 29 of the first arm 65. Similarly, the rod-shaped member 25 of the first arm 65 passes through the pass-through part 29c that is formed in the press plate 29 of the second arm 66. The gripping device 7 can grip a workpiece 90b of a small size, with the position of the respective arms 65, 66, and 67 being adjusted.

The gripping device 7 can also grip a plurality of types of the workpieces 90a and 90b of different sizes. Moreover, the gripping device 7 can grip the workpieces 90a and 90b, with the plurality of arms 65, 66, and 67 being moved by a small number of motors. This makes it possible to reduce the weight of the gripping device 7. The gripping device 7, in accordance with the size of the workpiece, can further fix the workpiece to a predetermined position. For example, in a case where the shapes of workpieces are the same, the workpieces can consistently be fixed at the same position.

Other configurations, actions, and effects of the third gripping device are the same as those in the first gripping device and the second gripping device, and thus the descriptions of these will not be reiterated here.

According to the aspects of the present disclosure, a lightweight gripping device for gripping a plurality of types of workpiece of different sizes can be provided.

The above-described embodiments can be combined as appropriate. In each of the above figures, the same or mutually equivalent portions are denoted by the same reference signs, Note that the above-described embodiments are merely examples and are not intended to limit the invention. Further, the embodiments encompass modifications of the embodiments set forth in the claims.

The invention claimed is:

1. A gripping device for gripping a workpiece, the gripping device comprising:
   a first arm and a second arm configured to move in directions opposite to each other and clamp the workpiece;
   a third arm configured to move in a direction intersecting the directions, in which the first arm and the second arm move, and engage with the workpiece;
   a rotation member configured to come into contact with the first arm, the second arm, and the third arm, and move the respective arms;
   a rotary machine configured to rotate the rotation member; and
   a rotation member moving cylinder configured to move the rotation member to a first position, a second position, and a third position between the first position and the second position; wherein
   the first arm and the second arm are arranged such that, when the rotation member is disposed at the first position, the first arm comes into contact with one side of the rotation member and the second arm comes into contact with another side of the rotation member,
   the third arm is disposed so as to come into contact with the rotation member when the rotation member is disposed at the second position, and
   the first arm, the second arm, and the third arm are arranged to be separated from the rotation member when the rotation member is disposed at the third position.

2. The gripping device according to claim 1, wherein
   the rotation member is a gear, and
   arms of the first arm, the second arm, and the third arm include respectively rod-shaped members each formed with a plurality of teeth for engaging with the gear.

3. The gripping device according to claim 2, further comprising:
   a position detector configured to detect a rotation angle of the rotary machine; and
   a controller configured to control the rotary machine, wherein
   the controller includes a storage unit configured to store information relating to control of the rotary machine,
   the position detector detects the rotation angle of the rotary machine when the rotation member moves from one position, out of the first position and the second position, to the third position,
   the storage unit stores the rotation angle detected by the position detector, and
   the controller controls a rotation angle of the rotary machine to be at the rotation angle stored in the storage unit when the rotation member moves from the third position to the one position.

4. The gripping device according to claim 1, further comprising a movement member coupled to the rotation member moving cylinder and configured to press the rotation member so as to move the rotation member, wherein
   the movement member includes a first press part configured to press the third arm when the rotation member is disposed at the first position, and a second press part configured to press the first arm and the second arm when the rotation member is disposed at the second position.

* * * * *